US012793099B2

(12) United States Patent
Best et al.

(10) Patent No.: US 12,793,099 B2
(45) Date of Patent: Nov. 10, 2026

(54) DIGITAL CONTENT MESSAGING SYSTEM

(71) Applicant: Best Network Systems Inc., Miami Beach, FL (US)

(72) Inventors: Jules Best, Berkeley, CA (US); Ainsworth Spence, Lake Worth, FL (US); Jonathan H. Lewis, Yadkinville, NC (US); Amit Kumar Jain, Pune (IN)

(73) Assignee: Best Network Systems Inc., Miami Beach, FL (US)

( * ) Notice: Subject to any disclaimer, the term of this patent is extended or adjusted under 35 U.S.C. 154(b) by 0 days.

(21) Appl. No.: 18/481,647

(22) Filed: Oct. 5, 2023

(65) Prior Publication Data

US 2024/0119477 A1 Apr. 11, 2024

Related U.S. Application Data

(60) Provisional application No. 63/461,184, filed on Apr. 21, 2023, provisional application No. 63/414,408, filed on Oct. 7, 2022.

(51) Int. Cl.
*G06Q 30/0207* (2023.01)

(52) U.S. Cl.
CPC ..... *G06Q 30/0222* (2013.01); *G06Q 30/0239* (2013.01)

(58) Field of Classification Search
CPC ........................ G06Q 30/0222; G06Q 30/0239
See application file for complete search history.

(56) References Cited

U.S. PATENT DOCUMENTS

| | | | |
|---|---|---|---|
| 8,755,824 | B1 | 6/2014 | Wang et al. |
| 8,806,530 | B1 | 8/2014 | Izdepski et al. |
| 8,978,075 | B1 | 3/2015 | Kaiser et al. |
| 9,106,975 | B1 | 8/2015 | Gildfind et al. |
| 9,635,118 | B1 | 4/2017 | DeLuca et al. |
| 9,743,130 | B2 | 8/2017 | Holland |

(Continued)

OTHER PUBLICATIONS

S. J. Mehta and J. Javia, "Threshold based KNN for fast and more accurate recommendations," 2015 IEEE 2nd International Conference on Recent Trends in Information Systems (ReTIS), Kolkata, India, pp. 109-113 (Year: 2015).*

(Continued)

*Primary Examiner* — Waseem Ashraf
*Assistant Examiner* — Christopher C Busch
(74) *Attorney, Agent, or Firm* — Carr & Ferrell LLP

(57) ABSTRACT

A digital content messaging system includes one or more media sources, a beacon (either physical or virtual), a user's smart device bound to a media device using a wallet Pass, a media device, and a processing device. The user's smart device is configured for storing a unique wallet Pass. The user's smart device is also for detecting when a user is in physical proximity of the media device, and for receiving messages from a messaging system through the stored wallet Pass. The media device is for detecting a channel that the user has selected; transmitting the channel information to a server; and receiving the media from the media sources. The processing device extracts key values from the media; matches key values from the media to a key value associated with a merchant offer; and transmits a URL of a merchant offer to the user's smart device.

25 Claims, 10 Drawing Sheets

(56) References Cited

U.S. PATENT DOCUMENTS

| | | | | |
|---|---|---|---|---|
| 10,212,174 | B2 | 2/2019 | Muddu et al. | |
| 10,433,140 | B2 | 10/2019 | Best | |
| 10,445,297 | B2 | 10/2019 | Mahyar et al. | |
| 10,475,066 | B1 | 11/2019 | Kakani et al. | |
| 10,506,367 | B2 | 12/2019 | Best | |
| 10,567,823 | B2 | 2/2020 | Navin et al. | |
| 10,567,907 | B2 | 2/2020 | Best | |
| 10,623,783 | B2 | 4/2020 | Barnett | |
| 10,757,534 | B2 | 8/2020 | Best | |
| 10,924,885 | B2 | 2/2021 | Best | |
| 10,972,888 | B2 | 4/2021 | Best | |
| 11,093,978 | B2 | 8/2021 | Vasudevan et al. | |
| 11,159,909 | B2 | 10/2021 | Anderson | |
| 11,734,651 | B2 * | 8/2023 | Schemers | H04L 51/214 705/7.19 |
| 11,756,028 | B2 * | 9/2023 | Shukla | G06Q 20/3224 705/66 |
| 11,783,375 | B2 | 10/2023 | Briancon et al. | |
| 12,242,930 | B2 * | 3/2025 | Pothula | G06N 20/00 |
| 2002/0087978 | A1 * | 7/2002 | Nicholson | H04N 21/6156 725/32 |
| 2004/0140361 | A1 | 7/2004 | Paul et al. | |
| 2008/0139112 | A1 | 6/2008 | Sampath et al. | |
| 2009/0076966 | A1 | 3/2009 | Bishop et al. | |
| 2009/0131079 | A1 | 5/2009 | Sekhar | |
| 2009/0235312 | A1 | 9/2009 | Morad et al. | |
| 2009/0264070 | A1 | 10/2009 | Lim | |
| 2010/0217671 | A1 * | 8/2010 | Lee | H04N 21/235 707/E17.108 |
| 2011/0066497 | A1 * | 3/2011 | Gopinath | G06Q 30/02 705/14.53 |
| 2011/0218994 | A1 * | 9/2011 | Holladay | G06F 16/7844 707/E17.054 |
| 2011/0258049 | A1 | 10/2011 | Ramer et al. | |
| 2011/0282724 | A1 | 11/2011 | Hwang | |
| 2011/0282748 | A1 * | 11/2011 | Ciurea | G06Q 30/0267 705/14.64 |
| 2012/0101952 | A1 | 4/2012 | Raleigh et al. | |
| 2012/0110618 | A1 | 5/2012 | Kilar et al. | |
| 2012/0215896 | A1 | 8/2012 | Johannsen | |
| 2012/0316940 | A1 | 12/2012 | Moshfeghi | |
| 2014/0067828 | A1 | 3/2014 | Archibong et al. | |
| 2014/0074593 | A1 | 3/2014 | Chomsky et al. | |
| 2014/0074621 | A1 | 3/2014 | Chai et al. | |
| 2014/0087712 | A1 | 3/2014 | Danford et al. | |
| 2014/0090001 | A1 * | 3/2014 | Das | H04N 21/4725 725/112 |
| 2014/0278978 | A1 * | 9/2014 | O'Connor | G06Q 30/0255 705/14.53 |
| 2014/0335897 | A1 | 11/2014 | Clem et al. | |
| 2014/0351418 | A1 | 11/2014 | Toubiana et al. | |
| 2014/0365304 | A1 | 12/2014 | Showers et al. | |
| 2014/0373036 | A1 | 12/2014 | Phillips et al. | |
| 2015/0113556 | A1 | 4/2015 | Weast et al. | |
| 2015/0215781 | A1 | 7/2015 | Reed et al. | |
| 2015/0248702 | A1 | 9/2015 | Chatterton | |
| 2015/0264051 | A1 | 9/2015 | Hoggan | |
| 2015/0324851 | A1 | 11/2015 | Campbell et al. | |
| 2015/0348015 | A1 * | 12/2015 | Ren | G06Q 20/3229 705/41 |
| 2016/0088443 | A1 | 3/2016 | Kostka et al. | |
| 2016/0180393 | A1 | 6/2016 | Mulye | |
| 2016/0182524 | A1 | 6/2016 | Khosravi et al. | |
| 2016/0259932 | A1 | 9/2016 | Lakshmanan et al. | |
| 2016/0285903 | A1 | 9/2016 | Hinchliffe et al. | |
| 2016/0337049 | A1 | 11/2016 | Dhakal et al. | |
| 2016/0342906 | A1 | 11/2016 | Shaashua et al. | |
| 2017/0150219 | A1 | 5/2017 | Bhattia et al. | |
| 2017/0161749 | A1 | 6/2017 | Shaikh | |
| 2017/0180046 | A1 | 6/2017 | Stout et al. | |
| 2018/0063684 | A1 | 3/2018 | Cheng et al. | |
| 2018/0101834 | A1 | 4/2018 | Laracey | |
| 2018/0176203 | A1 | 6/2018 | Wang | |
| 2018/0248850 | A1 | 8/2018 | Tee et al. | |
| 2018/0330348 | A1 | 11/2018 | Uhr et al. | |
| 2018/0351761 | A1 | 12/2018 | Li et al. | |
| 2018/0367946 | A1 | 12/2018 | Best | |
| 2018/0368819 | A1 | 12/2018 | Gogineni | |
| 2019/0020637 | A1 | 1/2019 | Andersen et al. | |
| 2019/0052659 | A1 | 2/2019 | Weingarten et al. | |
| 2019/0182649 | A1 | 6/2019 | Best | |
| 2019/0253834 | A1 | 8/2019 | Best | |
| 2019/0268717 | A1 | 8/2019 | Best | |
| 2020/0037139 | A1 | 1/2020 | Best | |
| 2020/0107158 | A1 | 4/2020 | Best | |
| 2020/0211061 | A1 | 7/2020 | Dasgupta et al. | |
| 2020/0402133 | A1 | 12/2020 | Buzzell et al. | |
| 2021/0174344 | A1 | 6/2021 | Fowler et al. | |
| 2022/0207571 | A1 | 6/2022 | Martin | |
| 2022/0277294 | A1 * | 9/2022 | Campbell | G06Q 20/36 |
| 2022/0374943 | A1 * | 11/2022 | Barnwal | G06N 3/0464 |
| 2023/0122353 | A1 | 4/2023 | Wurpts et al. | |
| 2023/0316424 | A1 * | 10/2023 | Lonson | H04N 21/4788 705/319 |
| 2023/0345241 | A1 * | 10/2023 | Duyk | H04W 12/77 |
| 2024/0070399 | A1 | 2/2024 | Tiwari et al. | |

OTHER PUBLICATIONS

Jeon et al., "BLE Beacons for Internet-of-Things Applications: Survey, Challenges and Opportunities," Social Media Lab, the Department of Electrical and Computer Engineering, The Hong Kong University of Science and Technology [online], Nov. 20, 2017 [retrieved on Feb. 4, 2019], Retrieved from the Internet: <URL:http://smedia.ust.hk/luxbeacon/resources/Jeon%20et#20al%20-%202018%20IOTJ.pdf>, pp. 1-18.

"Application," The American Heritage Dictionary of the English Language [online], 2019 [retrieved Jun. 12, 2019], Retrieved from the Internet: <URL:https://ahdictionary.com/word/search.html?q=application>, 1 page.

"Apple Wallet," Wikipedia [online], May 20, 2019 [retrieved Jun. 13, 2019], Retrieved from the Internet: <URL:https://en.wikipedia.org/wiki/Apple_Wallet>, 3 pages.

"Advertisement Recognition & Synchronization: Opportunities with mufin's Ad Recognition Software," Mufin, [Retrieved Oct. 10, 2023], available online at: <URL:https://www.mufin.com/usecase/advertisement-recognition-synchronization/>, 3 pages.

Shields, Roland, "Xaxis Eyes Cross-Screen Ad Dollars With Xaxis Sync," ExchangeWire.com, [Retrieved Oct. 10, 2023], available online at: <https://www.exchangewire.com/blog/2014/04/23/xaxis-eyes-cross-screen-ad-dollars-with-xaxis-sync/., Apr. 23, 2014, 4 pages.

* cited by examiner

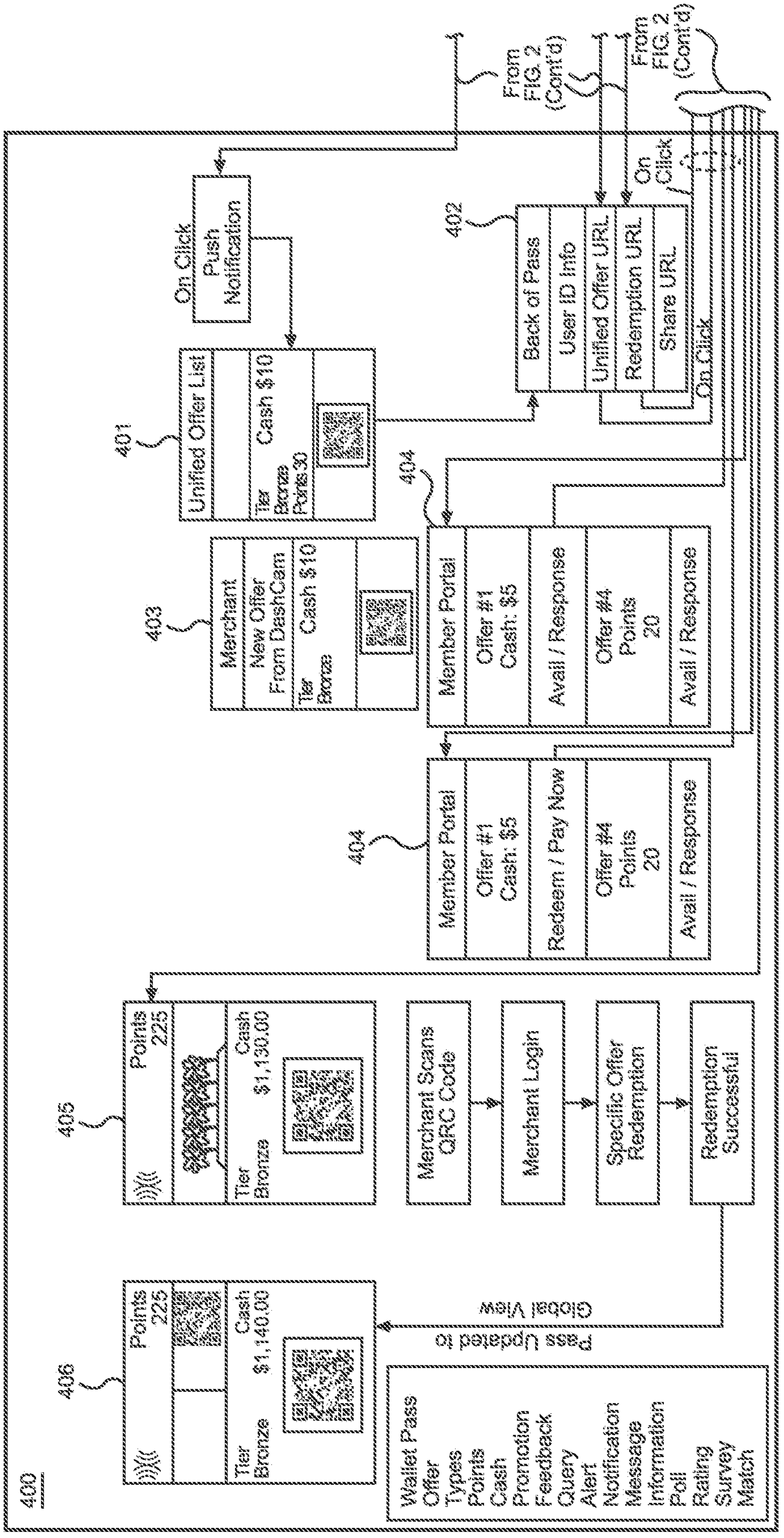
FIG. 2 (Cont'd)1

DIGITAL CONTENT MESSAGING SYSTEM

CROSS REFERENCE TO RELATED APPLICATIONS

This application claims the benefit and priority of U.S. Provisional Application Ser. No. 63/414,408, filed on Oct. 7, 2022, entitled "Media Devices with Embedded Wireless Beacons and Methods of Use" and the U.S. Provisional Application Ser. No. 63/461,184, filed on Apr. 21, 2023, entitled "Digital Content Messaging System," each of which are hereby incorporated by reference in their entirety including all references and appendices cited therein for all purposes. This application is also related to U.S. Pat. No. 10,506,367, issued on Dec. 10, 2019, entitled "IOT Messaging Communications Systems and Methods"; U.S. Pat. No. 10,433,140, filed on Dec. 10, 2018, issued on Oct. 1, 2019, entitled "IOT Devices Based Messaging Systems and Methods"; U.S. Pat. No. 10,567,907, filed on Apr. 23, 2019, issued on Feb. 18, 2020, entitled "Systems and Methods for Transmitting and Updating Content by a Beacon Architecture"; U.S. Pat. No. 10,757,534, filed on May 9, 2019, issued on Aug. 25, 2020, entitled "IOT Near Field Communications Messaging Systems and Methods"; U.S. Pat. No. 10,972,888, filed on Sep. 20, 2019, issued on Apr. 6, 2021, entitled "IOT Devices Based Messaging Systems and Methods"; and U.S. Pat. No. 10,924,885, filed on Dec. 4, 2019, issued on Feb. 16, 2021, entitled "Systems and Methods for IOT Messaging Communications and Delivery of Content," all of which are hereby incorporated by reference in their entirety including all references and appendices cited therein for all purposes.

FIELD

The present disclosure is related generally to digital content messaging systems and more particularly, but not by way of limitation, to digital content messaging systems and methods for utilizing artificial intelligence to provide personalized, targeted ad content to users.

BACKGROUND

Merchants wish to sell products or services to consumers, but utilizing traditional methods and systems, they often fail to reach their target consumers and as a result, the opportunities to sell products or services appear limited. Also, traditionally, merchants do not have visibility on whether their marketing campaigns are effective or not based on factual evidence.

SUMMARY

According to certain embodiments, the present technology may be directed to a system comprising one or more media sources, a physical or virtual beacon that has a unique passID, a user's smart device configured to be bound to a media device using a wallet Pass, a media device, and a processing device. The user's smart device is further configured for storing a unique wallet Pass. The user's smart device is also for detecting when a user is in physical proximity of the media device, and for receiving messages from a messaging system through the stored wallet Pass. The user's smart device further comprises a web browser for viewing URLs contained in messages received in the wallet Pass. The media device is for detecting a channel that the user has selected; transmitting the channel information to a server; and receiving the media from the one or more media sources. The processing device extracts one or more key values from the media; matches one or more key values from the media to a key value associated with a merchant offer; and transmits a URL of a merchant offer to the user's smart device. The processing device also continuously gathers data in a feedback loop, in order to provide improved recommendations to a merchant or the user. The gathered data includes a unique identifier for tracking the transmitting of the merchant offer to the user's smart device to a redemption of the merchant offer by the user via the user's smart device.

According to certain embodiments, the present technology may be directed to a method, starting with extracting one or more key values from media. The one or more key values from the media are matched to a key value of offers in a merchant offer warehouse. Personalized content based on user preferences, past responses to previous merchant offers, and user location are provided. Offers are linked that have a business or logical connection, resulting in multiplexed offers. A URL of a merchant offer is transmitted to a user's smart device. Linked, multiplexed offers are transmitted to the user's smart device. Data is continuously gathered in a feedback loop, in order to provide improved recommendations to a merchant or the user, the data including a unique identifier for tracking the transmitting of the merchant offer to the user's smart device to a redemption of the merchant offer by the user via the user's smart device.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Exemplary embodiments are illustrated by way of example and not limitation in the figures of the accompanying drawings, in which like references indicate similar elements.

FIG. 1 is a block diagram of an example system.

FIG. 2 is a schematic architecture diagram of an example system.

FIG. 3 is a block diagram of a SDK on a user's media device used to determine Who's Watching What Where When and How in accordance with the present disclosure.

FIG. 4 is a flow diagram of an example method in accordance with the present disclosure.

FIG. 5 depicts a block diagram to highlight numerous across boundary interfaces that are possible data collection points for attribution.

FIG. 6 depicts a chart comparing a single and a multiplex offering.

FIG. 7 illustrates an exemplary computer system that may be used to implement some or all embodiments of the system.

FIG. 8 is a signal flow diagram illustrating a method performed in accordance with the present disclosure.

DETAILED DESCRIPTION

Overview

The present disclosure pertains to digital content messaging systems and methods utilizing artificial intelligence to provide personalized, targeted ad content to users. Merchants and advertisers want to reach their targeted users, and this present disclosure helps merchants and advertisers to reach their targeted audience by overcoming many obstacles that traditional systems do not address.

For instance, when a user views a program on a television, the user may also be presented with advertisements (ads), but unfortunately, those ads are oftentimes not targeted nor personalized to the user's preferences. Instead, the ad content is restricted to channel programming and thus, the same ad is shown to all users, without taking into account a particular user's preferences. Also, using traditional systems, it is impossible to determine which user is watching what tv program or streaming program. In other words, using traditional systems, one cannot answer the question of "Who is Watching What When Where and How"—that is, "Which user is watching what program on what device"?

To provide a decisive answer to the crucial question of "Who is Watching What When, Where and How", systems and methods utilizing artificial intelligence and an electronic wallet Pass to provide personalized, targeted content to users are disclosed herein. It should be noted that although the present disclosure will at times refer to television programming and tv channels, the present disclosure is not limited to simply television programming. Instead, digital content as used in the present disclosure includes audio, video, and/or textual content that can be offered by a variety of platforms and service providers via one or more media sources, including but not limited to, podcasts, streaming services, audiobooks, on-demand programming, news aggregators, cable programming, tv programming, live programming, video games, software, movies, the Internet, the metaverse (or virtual reality) and the like.

Example Embodiments

Figure 1:
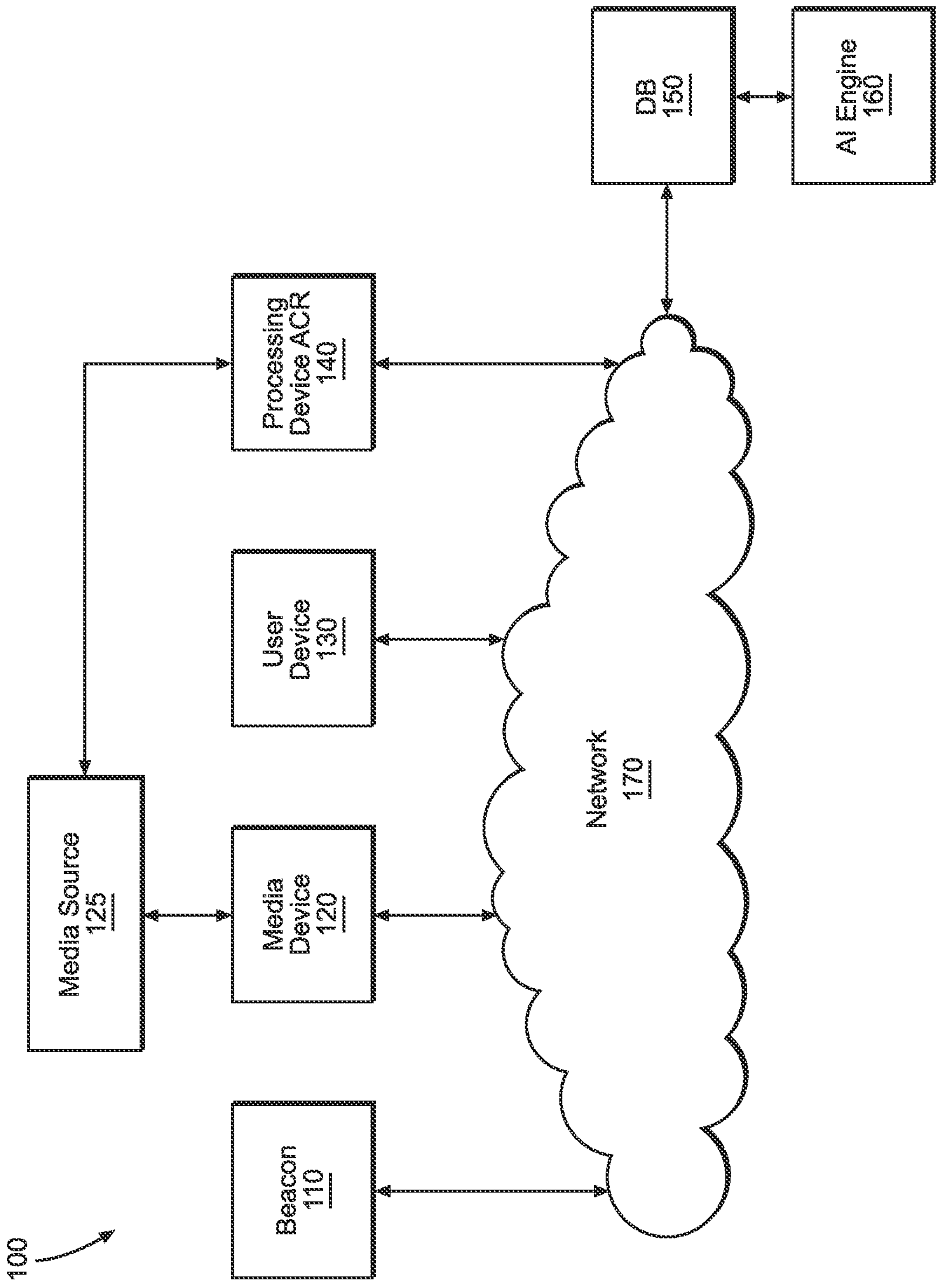

FIG. 1 depicts a block diagram of an exemplary system 100 utilizing artificial intelligence to provide personalized, targeted ad content to a user. The system 100 comprises a beacon 110, a media device 120, a user device 130, a media source 125, a processing device ACR 140, a database 150, an AI engine 160, and a network 170. The system 100 of the present disclosure includes a media device 120 having an embedded application providing URLs with dynamic personalized content to the user device 130, such as a smartphone. As depicted, the beacon 110, the media device 120, the user device 130, the processing device ACR 140, the database 150, and the AI engine 160 communicate via the network 170. However, one skilled in the art can appreciate that in some embodiments, one or more of the beacon 110, the media device 120, the user device 130, the processing device ACR 140, the database 150, and the AI engine 160 can directly communicate with one another.

In some embodiments, the network 170 is a cloud, thereby providing a cloud-based computing environment, which is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™, or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user. An essential function performed in the cloud are some of the more sophisticated and data intensive AI algorithms used in the present embodiment in order to provide offer personalization and merchant campaign management. More details regarding the AI algorithms will be provided later.

In general, FIG. 1 depicts a system 100 that provides personalized, targeted advertising to an end user device 130 based on media consumed by a viewer/listener. The media consumed by the viewer/listener is provided by one or more media sources 125 to the media device 120. The beacon 110 can be a physical or virtual beacon that has a unique passID. A media device 120 is a device, such as a television, set-top-box, or any other hardware, that is configured to deliver media through linear broadcast TV or OTT/CTV. Specific devices include, but are not limited to, TV, tablet, kiosk or any device connected to the internet and in this way is device agnostic. The user device 130 can be a smart device (such as a smartphone). The user device 130 (sometimes referred to as the user's smart device) has a native wallet Pass application that allows interaction with the media device 120 (such as a television) or the user's smart device with the BNS offer warehouse. This allows advertising campaigns to extend their engagement to include digital content messaging that is linked to the content being consumed in real-time.

The user device 130 is bound to the media device 120 using a wallet Pass. The user device 130 stores a unique wallet Pass and detects that the user or viewer is in physical proximity of the media device 120. The user device 130 receives messages from a messaging system through a stored wallet Pass. The user device 130 has a web-based member portal for viewing URLs contained in messages received in the wallet Pass.

An offer sent to the wallet Pass is determined by an AI algorithm used to extract specific information from the media content. That offer is then passed to a second AI algorithm in the AI engine 160 in the cloud to determine if the specific pass holder is interested in the offer in question. The AI engine 160 and the artificial intelligence utilized by the system will be described in further detail later herein.

Figure 2:
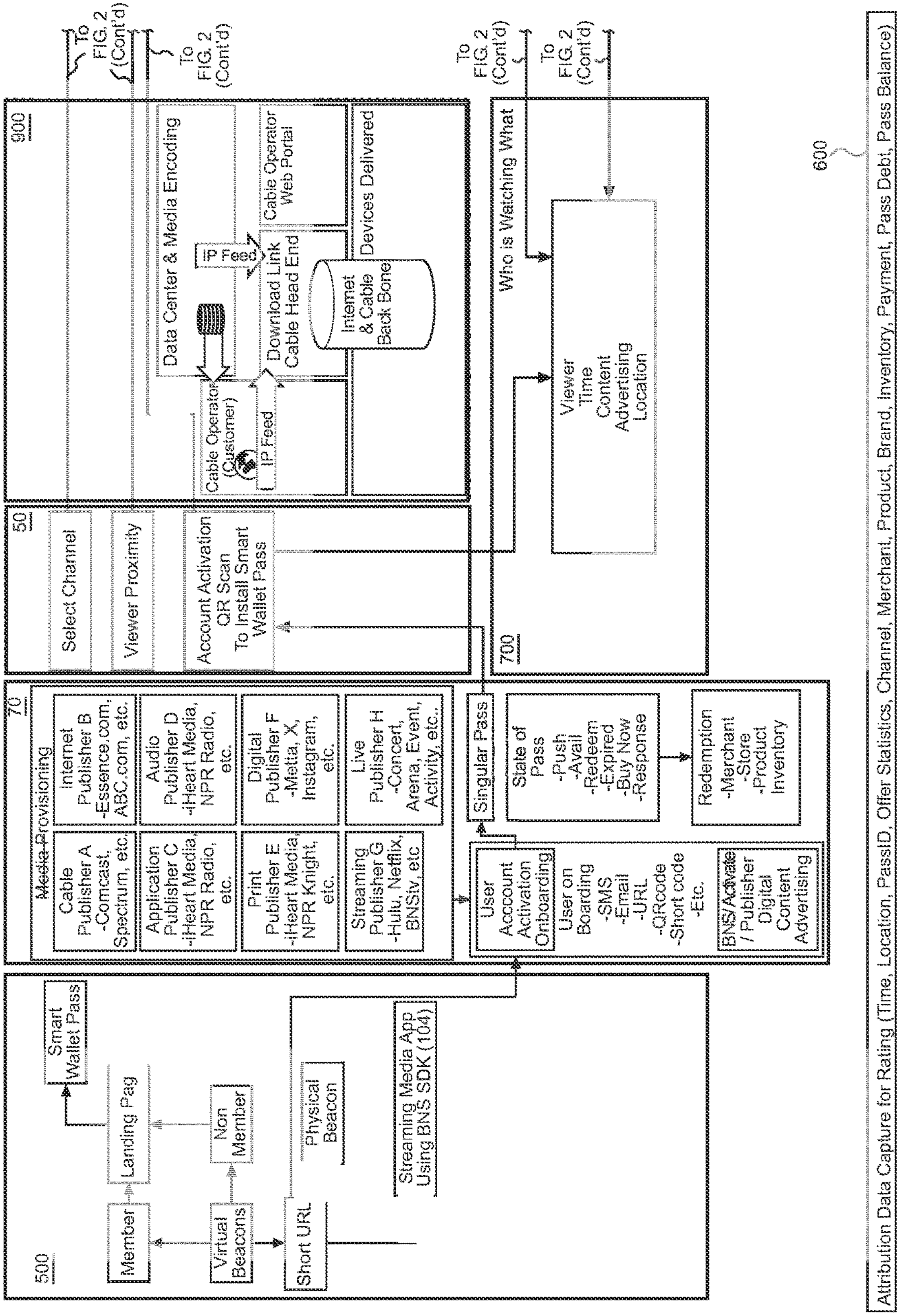
Figure 2:
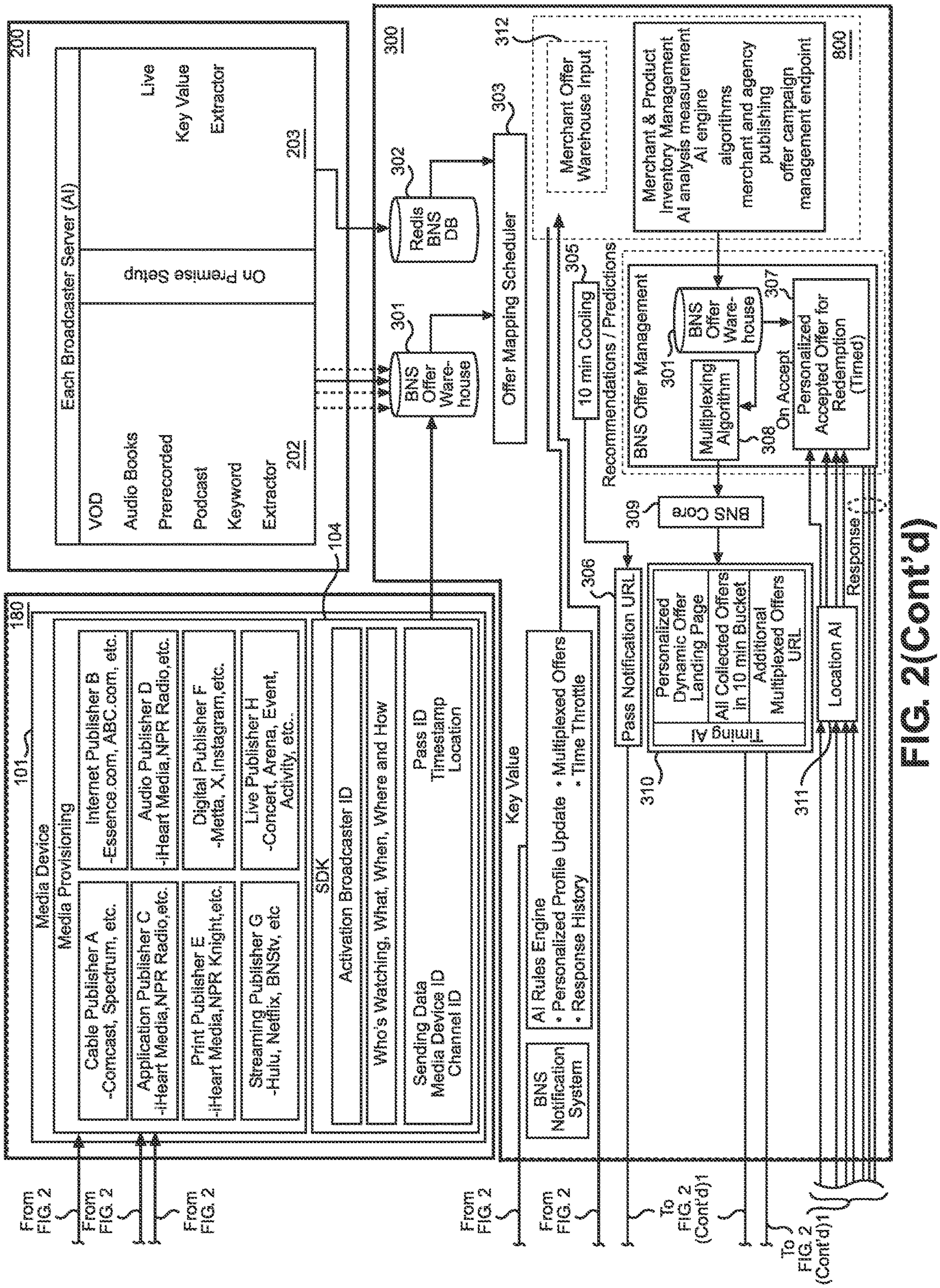
Figure 3:
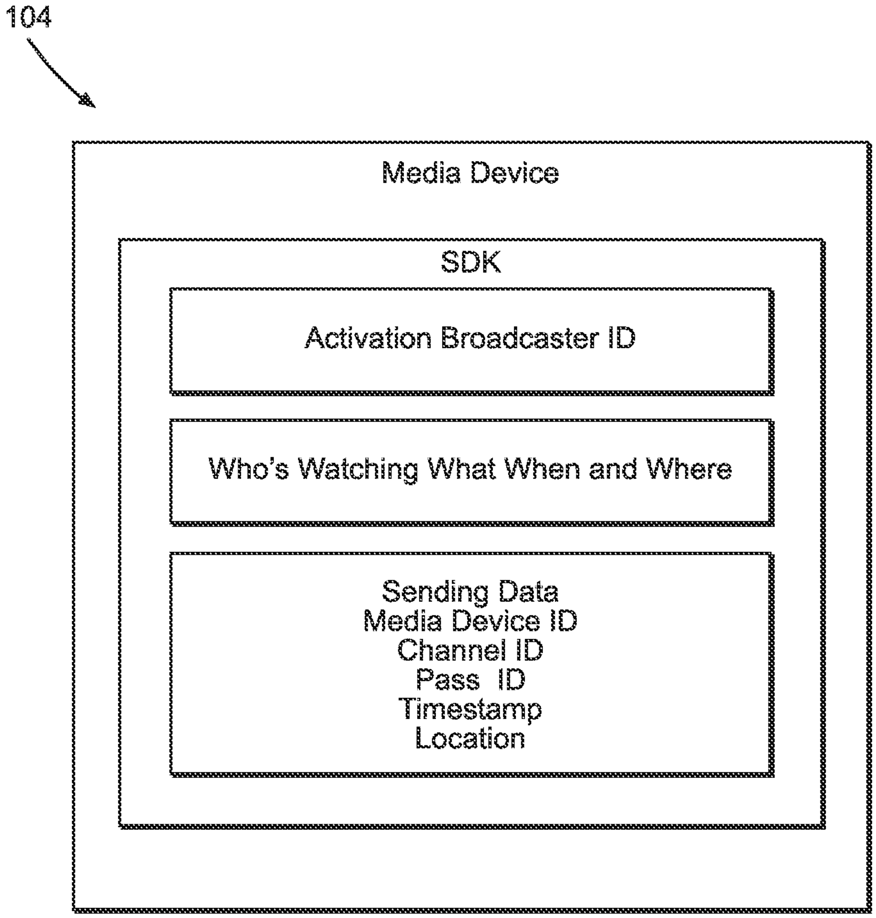

The "Who is Watching What When Where and How" information is identified using a media application that is implemented on the user's media device with an application with our embedded SDK 104 in FIG. 2. The SDK 104 in FIG. 3 is also similarly shown as SDK 104 in FIG. 2. The SDK [140] 104 is encompassed in a system component 180 of FIG. 2, and is associated with the media device 101 (FIG. 2). The media device OTT (Over-the-Top) Platform includes the SDK 104. Still referring to FIG. 3, an important aspect of the present disclosure is to present personalized content to an end user device 130 in FIG. 1 (such as a smartphone) based on 1) proximity to the viewing or listening device, 2)

current advertising content being consumed and 3) other data specific to the viewer or listener preferences.

In the present disclosure, now referring to FIG. 2, a media device software application having been created using the SDK 104 will do the following functions, starting with obtaining a short URL that represents a virtual beacon. This forms a common interface 500 for both physical and virtual beacons. This URL is unique for every viewer's pass that has onboarded into the BNS system. It links the media device ID number with an account activation (i.e., the scanned QR code), and it presents to the user a unique wallet Pass to be stored in the user's native electronic wallet app. The wallet Pass that acts as a virtual beacon in the smartphone could alternatively be obtained using a downloadable link or app on the user device (130 of FIG. 1). It should be understood that the Pass account activation can be obtained by either scanning QR code or downloading a link or application.

A Broadcast/Cable Operator (900 of FIG. 2) connected to the internet backbone using their Data Center & Media encoders takes the originating signal and distributes it to their head ends or distributed data centers. In a media provisioning component (70 of FIG. 2), during user onboarding, data is collected based on users' media channels, examples of which are shown in FIG. 2, that are currently being viewed. Simultaneously, user channel selection and activation data are captured (50 of FIG. 2). Subsequently, when a viewer selects specific content, the system will have all the data needed to determine "who's watching what, when, where, and how." This data is then transmitted to the Demand Side Interface (700 of FIG. 2). Within this interface, the data is utilized to provide insights into historical viewership patterns and assess the effectiveness of advertising campaigns over time and across various locations.

Moreover, the system includes a mechanism for establishing consumers' channel preferences, enabling the tracking of the redistribution path from the content originator. This path can be monitored using the unique BNS Broadcaster ID, which is matched with the viewer/listener wallet pass. This comprehensive tracking system allows for end-to-end campaign monitoring to determine effectiveness across multiple channels, all managed through a single wallet pass.

Still referring to FIG. 2, the user or viewer scans the QR code, and a unique PassId is generated from the unified BNS entry point system. The viewer (50 of FIG. 2) then stores the singular Wallet Pass on their smartphone. External to the system are the media publishers or media sources that provide a variety of entertainment and commercial advertising content. The media can be video, text, and/or audio, or any combination thereof, and it can be broadcast or streamed digitally to a viewing device. The content presentation format can be but is not limited to, conventional linear TV, live or pre-recorded; Video on demand (e.g. Netflix), audio book or podcast. A BNS software utility runs in real-time to scan and parses all content being broadcast from the media provider to detect the presence of specific words or phrases, which are referred to as a keyword(s). In the case of video-on-demand, the scan and parsing to extract keyword(s) need not happen in real-time. The extracted keyword(s) information is combined with the SDK output and is sent to the BNS offer warehouse 301 within the system of FIG. 2. As shown in 202 and 203 of FIG. 2, as part an extractor component 200, in addition to extracting text as the key value, other methods include OCR, NLP, audio signal, video signal, symbols in the image, content file metadata, advertising pixel tag, hash tags, metatag, or AI derived context.

The cloud services 300 of FIG. 2 implement the core functions of storing offers, utilizing AI-based rules that determine offer personalization, hosting the various URL landing pages and providing the offer notification system (see FIG. 2). The merchant offers are stored in an offer warehouse. Product Inventory management utilizes a variety of AI algorithms in order to provide customized analysis and measurement. By allowing merchants to input their product inventory, the system adaptively generates an offer campaign using a subset of the available inventory. As the campaign progresses, the AI engine 800 of FIG. 2 diligently evaluates the efficacy of various offers. The cloud services have a utility that provides merchant offer details to be easily imported into the BNS offer warehouse from an Excel file. The offer details include, but are not limited to, unique offer ID, offer duration, offer start date, offer end date, keys, product, product ID, broadcast ID, brand, offer type, offer amount, keyword, key value, redemption limit, offer geographic location, which are provided by the merchant offer warehouse input 312 of FIG. 2. When the media content is played through a viewing app that was created using the SDK, information regarding the current "channel" being watched is made available to the system 100 (FIG. 1).

From a server located in the cloud or on the premises of the digital content provider the key extraction system (also known as the extractor 203 in FIG. 2) analyzes all video content that can possibly be selected by viewers. In some embodiments, the key extraction system is included in the AI engine (160 of FIG. 1) of the processing device ACR (140 of FIG. 1). In the case of using a keyword the extractor uses an optical character recognition algorithm to scan words that are present in the media stream. Keywords can also be extracted from audio using a natural language processor algorithm. Furthermore, key values can be extracted from audio by using a variety of techniques, such as signal analysis, metadata, some audio equivalent to pixel tags, and the like.

The proposed system and method for keyword extraction and normalization from audio captures using NLP combine several technologies and processes to achieve accurate and consistent results, including but not limited to the following:

Audio Capture and Preprocessing: Audio data is captured using microphones or recording devices. Preprocessing involves noise reduction, audio segmentation, and conversion to a suitable format, such as WAV or MP3.

Speech-to-Text Conversion: Speech recognition technology, such as Automatic Speech Recognition (ASR) systems, converts audio into text. ASR systems may incorporate deep learning models, like recurrent neural networks (RNNs) or Transformers, for improved accuracy.

Keyword Extraction: NLP techniques, including tokenization, part-of-speech tagging, and named entity recognition, are applied to the transcribed text. Algorithms such as TF-IDF (Term Frequency-Inverse Document Frequency) or keyword extraction models like TextRank or YAKE are employed to identify significant keywords. Semantic analysis may be used to determine context and relevance.

Keyword Normalization: Extracted keywords may undergo normalization processes to standardize them Stemming: Reducing words to their root form (e.g., "running" to "run").

Offer dispatch: Keywords are sent to BNS system and the offers are dispatched accordingly The primary function of the keyword extractor 203 is to identify in real-time the commercial and/or product in the video stream. In addition to keywords there are other key extraction methods that can be used to identify commercials. These can be a symbol in a video image, an advertising pixel tag, and audio tag, hash tag, metadata, OCR, NLP, audio signal, video signal, symbols in the image, content file metadata, advertising pixel tag, hash tags, metatag, or AI derived context, or a combination of all of the above (202 of FIG. 2).

In the case of keywords or key values, for every keyword identified in the media content a keyword pair is created and stored in a Redis database (302 of FIG. 2). Redis is a distributed, in-memory key—value database being used as a fast-caching system. The key is the channel, and the value is the extracted word(s) on a particular channel, i.e. {NBC: Burger King}. The Redis database 302 and the offer warehouse 301 input data to the offer mapping scheduler 303.

In order to determine if an offer is to be sent, four pieces of information are needed: i) viewer proximity to the media device; ii) a key extracted from the current channel a viewer is watching, i.e. "who's watching what"; iii) what real-time commercials are being displayed and iv) is there a matching offer stored in the offer warehouse. By comparing and matching all four in real-time the decision to send an offer is made. In case of on-demand content, additional information stored in the Redis DB are program ID and playback timestamp.

Before an offer is sent to the end-user, the AI rules engine is used to determine personal profile, response history, and additional offers that have a business of logical connection to the present direct matched offer. This is what is referred to as multiplexing as depicted in 308 of FIG. 2. We propose the integration of advanced machine learning models, regression analysis, classification algorithms, and demand forecasting methodologies, all driven by data.

Figure 6:
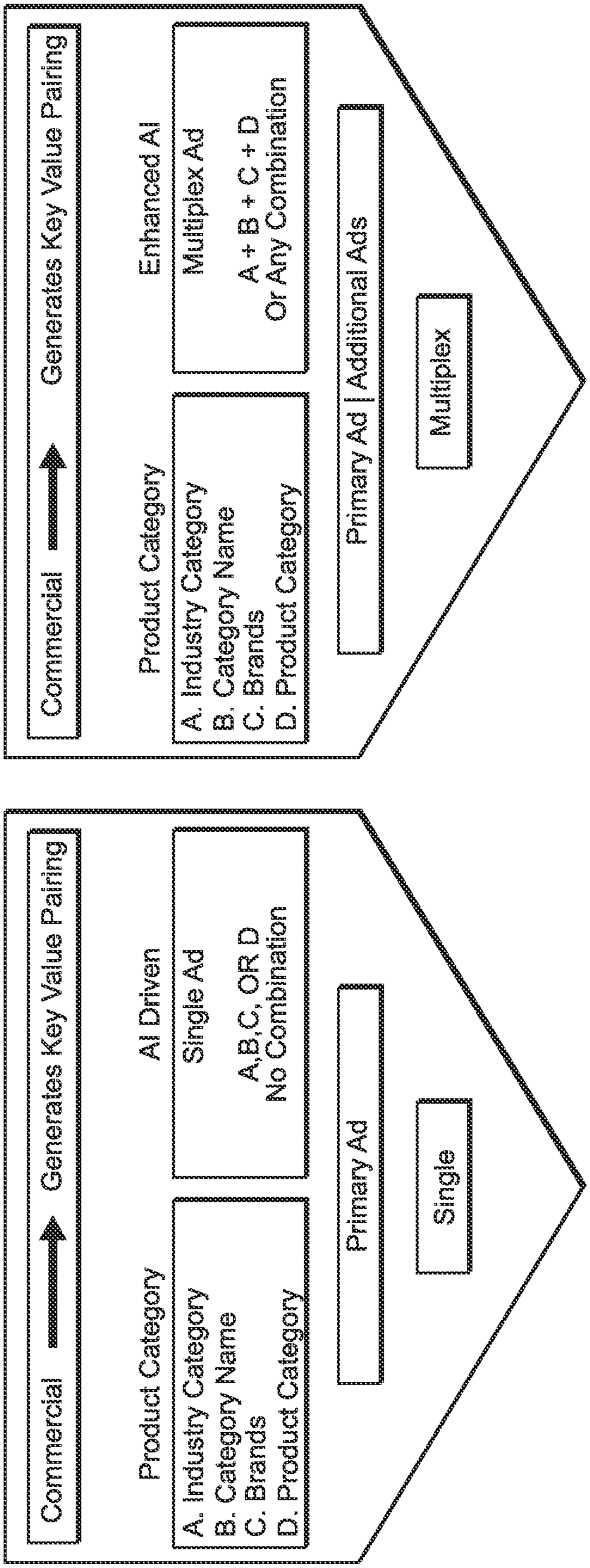

Referring now to FIGS. 2 and 6, collectively, FIG. 6 depicts an explanation and comparison of single versus multiplexed offers. Commercially available notification manager utilities may place time restrictions on the rate at which offers can be sent. A single user can only be sent offers at a rate of 1 per 10 minutes from the same source. Therefore, a time throttle is used to limit push notifications to this rate (305 of FIG. 2). If more than one offer is a direct match during the 10-minute cooling window, that offer is stored, and a push notification (306 of FIG. 2) is not sent until the cooling period has expired. After a keyword direct match, the AI rules engine and 10 min cooling are all satisfied, and a push notification (306 of FIG. 2) is sent to the end-user device. The end-user device of FIG. 2 may correspond with the user device 130 of FIG. 1.

Now referring to FIG. 2, a push notification shows on the user mobile device as a pop-up alert overlay. The user can then open the electronic wallet of the user device and then select the wallet Pass. The information on the wallet Pass is determined in the system and can be updated in real-time. At this point the Pass contains relevant information regarding the current offer(s). To view the actual offer, the user must select the URL and browse to the user-specific dynamic offer landing page 310, which is unique to them and contains their personalized targeted offer(s).

Still referring to FIG. 2, selecting the URL as described above uses standard internet protocol and therefore coarse information regarding the user location is detected in the system. Final location specific information is used to present the user an offer that is associated with their current location (311). As an example, Burger King in LA may have different offers than Burger King in NYC and based on which city the user is in they will get the appropriate offer(s).

The personalized offers are populated on a user specific dynamic landing page (310). These offers are displayed in the user's browsers. The user can then either accept or reject an offer 403. If accepted, the offer is stored for the user for later redemption (307).

Figure 4:
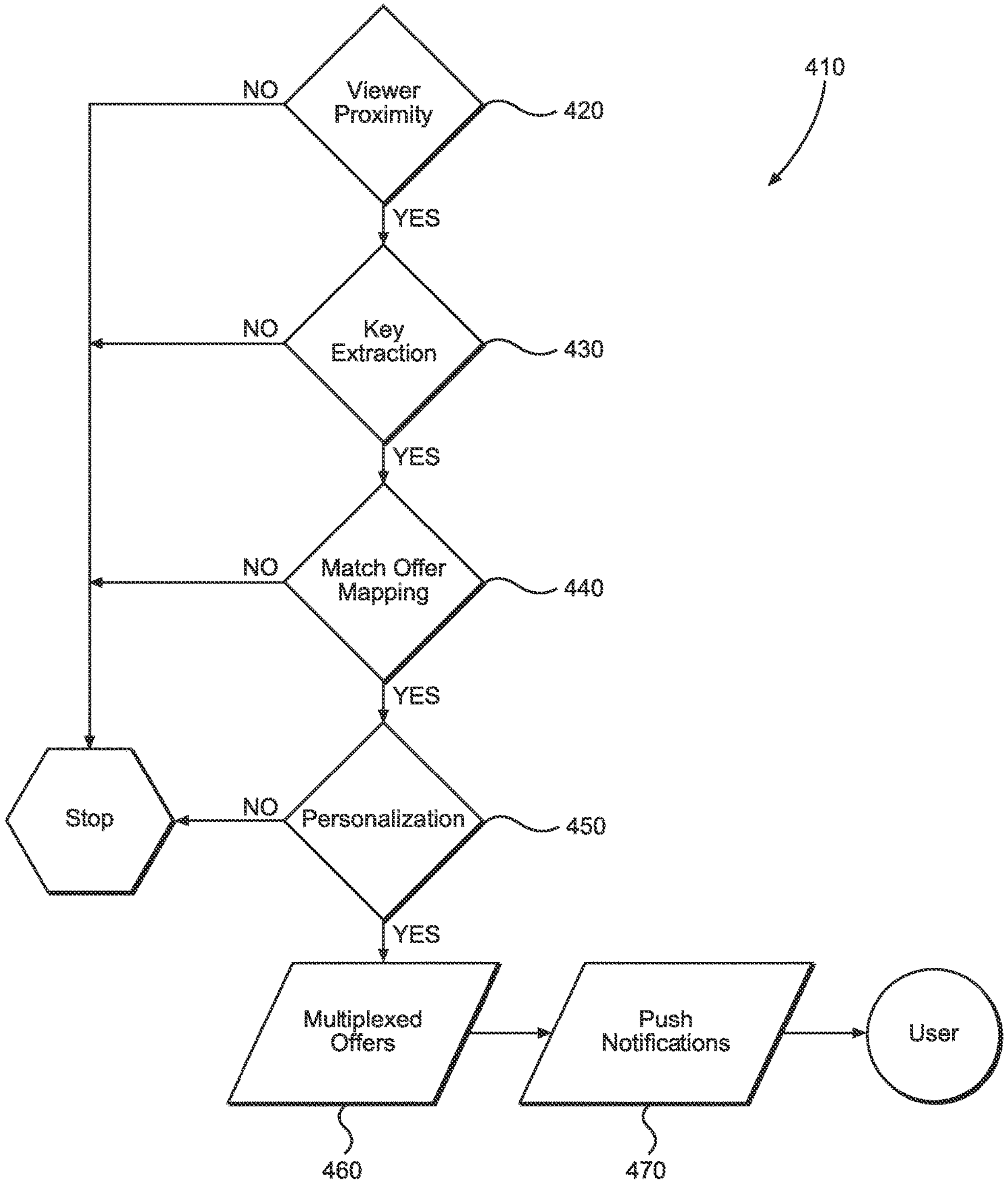

FIG. 4 is a flowchart diagram of a high-level method 410 in accordance with the present disclosure. The BNS Core 309 (FIG. 2) may assist in performing one or more of the steps provided in the method 410. The BNS Core 309 (FIG. 2) utilizes the various systems and methods that are described in U.S. Pat. No. 10,506,367, issued on Dec. 10, 2019, entitled "IOT Messaging Communications Systems and Methods"; U.S. Pat. No. 10,433,140, filed on Dec. 10, 2018, issued on Oct. 1, 2019, entitled "IOT Devices Based Messaging Systems and Methods"; U.S. Pat. No. 10,567,907, filed on Apr. 23, 2019, issued on Feb. 18, 2020, entitled "Systems and Methods for Transmitting and Updating Content by a Beacon Architecture"; U.S. Pat. No. 10,757,534, filed on May 9, 2019, issued on Aug. 25, 2020, entitled "IOT Near Field Communications Messaging Systems and Methods"; U.S. Pat. No. 10,972,888, filed on Sep. 20, 2019, issued on Apr. 6, 2021, entitled "IOT Devices Based Messaging Systems and Methods"; and U.S. Pat. No. 10,924,885, filed on Dec. 4, 2019, issued on Feb. 16, 2021, entitled "Systems and Methods for IOT Messaging Communications and Delivery of Content," all of which are hereby incorporated by reference in their entirety including all references and appendices cited therein for all purposes. At step 420, the system determines if the viewer is in physical proximity of the media device. If the viewer is not in physical proximity of the media device, the method 410 stops. If the viewer is in physical proximity of the media device, the method 410 continues with step 430 where one or more key values are extracted from the media. The key extraction can be accomplished by the processing device ACR 140 (FIG. 1). If step 430 is successful and one or more key values are extracted from the media, the method continues with step 440. If step 430 is not successful, then the method 410 stops.

At step 440, the one or more key values from the media are matched to a key value of offers in the merchant offer warehouse. This is called "match offer mapping." The offer warehouse serves as a centralized platform for end-to-end offer management collecting first, second-, and third-party data. It facilitates the creation of offers with comprehensive details such as redemption locations, product or associated brand, or product industry. An essential component of offer details is the assigning of a unique key value that identifies the offer and is used to link an offer with commercial content through use of the Automatic Content Recognition (ACR). These can be a symbol in the OCR, NLP, audio signature, video signature, video image, advertising pixel tag, and audio tag, hash tag, metadata, AI content or a combination of all of the above (202 of FIG. 2).

The ACR module is designed to extract key values from media content, enabling efficient analysis and processing. It captures relevant information from various types of media, which enables the system to understand and identify the current commercial content and product and/or brand being advertised.

By using native e-Wallet Pass technology, offers can seamlessly integrate with traditional advertising campaigns. If step 440 is successful, then the method 410 continues with step 450. If step 440 is not successful, and no matching occurs, then the method 410 stops.

At step 450, the steps of personalization occur. Personalization includes providing personalized content based on user preferences, past responses and user location. If step 450 is successful, then the method 410 continues with step 460. If not, the method 410 stops.

At step 460, multiplexing of offers occurs, where offers are linked to other offers which have a business or logical connection. (Offers, Promotions, Cash, feedback, query, alert, notification, message, information, survey, poll, rating, match) The multiplexing of offers may be accomplished using one or more unique identifiers associated with a given product or service. Finally, at step 470, a push notification is sent to the user. In other words, a URL of the merchant offers is transmitted to the user's smart device; and linked offers are transmitted to the user's smart device. The user receives messages through a push notification that presents them with a URL link to their personalized repository of offers/messages. The link in turn takes the user to their member portal which serves as the place where consumers perform all subsequent transactions with an offer. The messages can be delivered to the user utilizing various delivery methods, including but not limited to, SMS, text, email, notification, one-time password (OTP) and Unstructured Supplementary Service Data (USSD). The system will track all consumer interactions with an offer by capturing data which includes, date/time/location offer was first pushed; date/time/location of consumer initial response to accept (often referred to as avail) an offer or ignore an offer; date/time/location the consumer redeems an offer; date/time an availed offer expires without being redeemed. The use of Artificial Intelligence (AI), which uses all captured data to enhance the targeting of content, operates within the offer warehouse continually learning and making offer recommendations and predictions. In this way, the AI will provide more effective and relevant content for both merchants and consumers.

Figure 5:
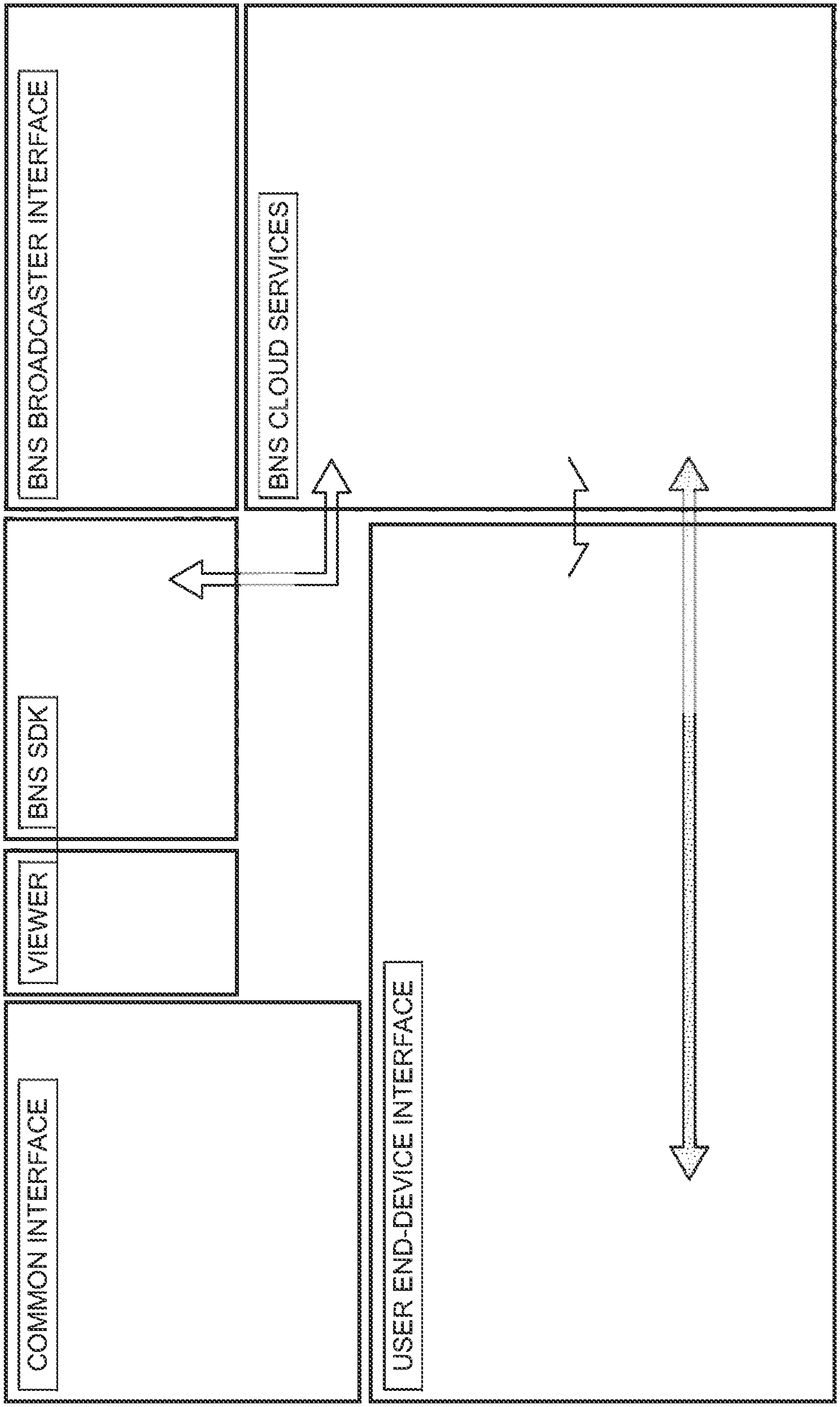

It should be noted that attribution data can be collected and fed into the AI engine to help guide future notification predictions and recommendations. Every time data and/or information is moved in or out of the system there will be an opportunity for the collection of data. An attribute data capture 600 (FIG. 2) is for rating based on a number of parameters, including time, location, passID, etc. As an exemplary figure, FIG. 5 is a block diagram that highlights the numerous points across boundary interfaces that can be possible data collection points for attribution.

Later, when the user wishes to redeem an offer, they can browse to their member portal, which serves as a repository of all previously accepted offers. Referring generally to a component 400 of FIG. 2, a unified offer list 401 is presented to the user. Each offer 403 of the unified offer list 401 will present a "Redeem" button that the user can click (in the member portal 404 of FIG. 2). Each offer includes on a back of a pass 402 with associated information. When clicked, the system sends data to the wallet Pass that will update the front of the wallet Pass with information needed for merchant redemption (405 of FIG. 2). The redemption view will persist on the user's wallet Pass for 10 minutes. After 10 minutes, the Pass view will revert to a global view that shows all accumulated points or cash on the Pass (406 of FIG. 2). If the merchant is a bank, the system can support using the Pass as a reloadable credit card.

Several embodiments regarding the artificial intelligence utilized by the system are disclosed herein. In exemplary embodiments, the system engages in the monitoring of merchant activities and conducts in-depth analyses, thereby furnishing valuable, instantaneous insights to brands aiming to oversee the worldwide efficacy of advertising campaigns across numerous merchants and diverse media platforms. The operational process involves AI processing encrypted consumer IDs, along with timestamped and geo-tagged data regarding ad acceptance and offer redemption instances. By harnessing this data, the AI engine constructs intricate models depicting campaign efficacy across different publishers, ad agencies, merchants, brands, products, geographic regions, distribution points and vendors, and specific times of day when offers are presented. Additionally, the AI engine's prowess extends to suggesting potential alterations for refinement or even complete discontinuation, thereby aiding in the enhancement of campaigns. The AI engine aids merchants with management of product inventory and deciphers user behavior without necessitating direct input of profile information from the user. These advanced user AI techniques customize the user experience by furnishing content recommendations and forecasts for precisely targeted advertisements.

Furthermore, the system boasts an AI engine (800 of FIG. 2). specifically designed for optimizing merchant product inventory. One of the system's standout features is AI Offer Optimization, which it extends to merchants. By allowing merchants to input their product inventory, the system adeptly generates an offer campaign using a subset of the available inventory. As the campaign progresses, the AI engine diligently evaluates the efficacy of various offers. Drawing insights from this evaluation, the AI system orchestrates campaign optimization by suggesting alterations to the offers. These recommendations may include adjustments in timing, audience targeting, or the exclusion of specific offers. Additionally, the AI engine extends its support by proposing products that are not currently associated with any ongoing campaign and proactively transmitting a comprehensive report to the merchant. The AI Offer Optimization functionality can be configured to operate automatically at predetermined intervals or activated on-demand at the merchant's discretion.

This fusion of AI-driven analysis and automated campaign management results in a dynamic and adaptive system, effectively elevating the standards of advertising effectiveness and responsiveness on a global scale. Some of the algorithms implemented for management of product inventory are:

1. Machine Learning Models:
   Regression Analysis: Employ regression models to forecast demand for various items based on historical sales data, user behavior, and external factors such as seasonality and economic trends.
2. Classification Algorithms:
   Categorize items using classification algorithms based on criteria such as demand level, user preferences, and supply availability, enabling prioritization for optimization efforts.
3. Demand Forecasting:
   Time Series Analysis: Utilize time series forecasting techniques like ARIMA and exponential smoothing to predict future demand trends for items.
   Prophet Algorithm: Implement Facebook's Prophet algorithm designed for precise time series forecasting, particularly in predicting item demand.
   Market Basket Analysis: Examine historical transaction data to unveil item co-occurrence patterns, facilitating the identification of frequently co-purchased items for effective cross-selling and bundling strategies.
4. Recommender Systems:
   Collaborative Filtering: Recommend items based on user behavior and preferences, enhancing the likelihood of converting demand into sales.

Content-Based Filtering: Propose items based on their attributes and features, aligning them with user preferences.

5. Supply Chain Optimization:

Linear Programming: Formulate linear programming models to optimize inventory levels, considering factors like demand, storage costs, and lead times.

Dynamic Programming: For complex optimization scenarios, employ dynamic programming to identify optimal strategies over time.

6. Clustering and Segmentation:

Leverage clustering algorithms to group items with similar characteristics or demand patterns, facilitating tailored strategies for different clusters to maximize profitability.

7. Natural Language Processing (NLP):

Analyze customer reviews, social media mentions, and textual data to gauge sentiment and identify emerging trends. This informs inventory decisions and marketing strategies.

8. Deep Learning:

Neural Networks: Implement neural networks for demand forecasting, accommodating complex data patterns and relationships.

Generative Adversarial Networks (GANs): Utilize GANs to generate synthetic data resembling real-world inventory scenarios, assisting in training models and simulations across various industries.

Incorporating these AI methodologies, the system revolutionizes the optimization of merchant inventory, user experience personalization, and the overall efficiency of the offering campaign process.

These data points are then sent to the Demand Side Interface (700 of FIG. 2), providing historical viewership and advertising campaign effectiveness over time and location.

A demand-side interface advertising AI auctioning system can provide various types of historical information about viewers or listeners to help advertisers make informed decisions when bidding on ad placements. Some of the key types of historical information it may offer include:

Demographic Data: This includes information about the age, gender, location, and other demographic characteristics of the viewers or listeners. Advertisers can use this data to target their ads to specific audience segments.

Behavioral Data: This includes information about the past online behavior of viewers or listeners, such as websites visited, content consumed, and previous ad interactions. This data helps advertisers understand user interests and preferences.

Purchase History: If available, historical data on viewers' or listeners' purchase behavior can be valuable. This may include information about past purchases or product searches, helping advertisers target users interested in their products or services.

Geographical Data: Historical location data can provide insights into the places viewers or listeners have visited in the past. Advertisers can use this information for location-based targeting.

In some embodiments the cloud-based AI engine can accomplish one or more of the following functions which are listed below. Further details of these functions are provided below each individual header:

1. Real-Time Merchant Performance Monitoring

Monitor merchant performance through AI algorithms, analyzing ad campaign metrics, engagement rates, and offer redemption patterns.

2. AI-Driven Real-Time Feedback

Leverage AI to provide immediate insights and feedback to brands on the success of their ad campaigns across different merchants and media platforms.

3. Campaign Performance Analysis

Utilize AI to analyze campaign performance based on metrics such as click-through rates, conversion rates, and user engagement.

4. Campaign Performance Models

Develop AI models that assess campaign performance across publishers, ad agencies, merchants, brands, products, geographic locations, and times of day when offers are presented.

5. Location and Time Analysis

Incorporate location and time data to identify geographical and temporal trends in campaign success.

6. Recommendation Engine for Campaign Changes

Implement an AI-driven recommendation engine that suggests adjustments to campaigns, considering factors like ad content, timing, and targeting.

7. Campaign Optimization Strategies

Utilize AI insights to recommend changes such as content adjustments, targeting refinements, or even pausing underperforming campaigns.

8. Automated Campaign Management

Set up an automated system that manages campaigns based on predefined performance thresholds.

9. Threshold-Based Campaign Management

If campaign performance falls below the set threshold, trigger automated actions like adjustments, pausing, or notifying campaign managers.

10. Data Feedback Loop and Learning

Continuously gather data on user interactions, offer redemptions, and campaign adjustments to improve future recommendations.

11. Performance Analytics and Reporting

Analyze campaign performance analytics and generate reports to inform brands about the effectiveness of their strategies.

12. Continuous Enhancement and Adaptation

Continuously refine AI algorithms, adapt to changing user behaviors, and incorporate new technologies to stay ahead in campaign optimization.

Also, the system has a user AI cluster recommendation and prediction engine. The purpose of user AI clustering is to provide a method to determine user behavior without the user having to directly input any profile information. User AI clustering techniques personalize the user experience, providing content recommendations and predictions for targeted ads tailored to individual preferences, delivering personalized and relevant offers to users for increased engagement and conversion rates.

The system also has AI engine for merchant product inventory. AI Offer Optimization is an advanced feature offered by the system to merchants. By providing a list of their product inventory, the system generates an offer campaign using a subset of that inventory. As the campaign progresses, the AI engine evaluates the success of different offers. Based on this evaluation, the AI system optimizes the campaign by providing recommendations for changes to the offer, such as adjusting the timing, targeting specific audiences, or even removing certain offers. Additionally, the AI engine offers recommendations for products that are not currently associated with a campaign and sends a report to the merchant. The AI Offer Optimization can either be setup to run automatically at a fixed interval or be run on demand by the merchant.

As mentioned earlier, the system further provides key value matching and AI clustering. Key value mapping refers to the mapping of the detected key values to the corresponding offers in the offer warehouse. AI Clustering refers to the AI clustering algorithms used by the system to categorize viewers into different user segments based on viewing habits, interests, and engagement history.

To expand upon the concept of AI Clustering, it is important to note that AI is used to reduce consumer interaction. Users are not asked for demographic of preferences but rather AI will be used to monitor direct consumer behavior and apply various algorithms to generate recommendations and predictions regarding which offer to send, or not send, to a particular Pass holder. Opinion matching is a fundamental challenge in applications requiring user-centric data tracking and personalized recommendations. Existing methods often struggle with noisy data and complex user preferences, resulting in suboptimal matching accuracy. The system presents an innovative approach that combines k-NN (k-Nearest Neighbors) near neighbor vector similarities with thresholding to achieve highly accurate and efficient opinion matching. By harnessing structured analytical data stored as vectors in a database, valuable insights are gained into user preferences and track their evolving choices.

Methodology

The approach comprises the following key components:

| STEPS | DESCRIPTION |
|---|---|
| Opinion Matching | Opinion matching is a critical process in various applications, ranging from personalized recommendations to sentiment analysis. The ability to accurately identify similar opinions significantly impacts the success of these endeavors. Traditional methods often encounter challenges with noisy data and variations in user preferences, leading to limited precision in matching. We propose a novel approach that leverages the power of k-NN near neighbor vector similarities and thresholding to improve the accuracy and efficiency of opinion matching. By utilizing structured analytical data represented as vectors in a database, we aim to offer deeper insights into user preferences and opinions. |
| Data Collection | Structured analytical data reflecting user opinions and preferences are gathered and stored as vectors in a database. This data forms the foundation of our opinion matching framework. |
| k-NN Near Neighbor Search | To identify similar opinions, we employ the k-NN algorithm, which efficiently retrieves the nearest neighbors of a given opinion vector. By comparing vector similarities, we establish close relationships between opinions. |
| Thresholding | To enhance the accuracy of our matching process, we introduce a threshold mechanism. This step filters out less relevant or dissimilar opinions, focusing only on highly similar matches. |
| Application-Centric Normalization | To address noise and variations in opinions, we apply application-centric normalization techniques. This normalization ensures consistent and meaningful representation of opinions within the specific application domain. |
| User-Centric Data Tracking | By identifying common opinion groups and preferences, our approach enables efficient user-centric data tracking. This tracking provides valuable insights into the evolution of user preferences over time. |
| Future Directions | In the future, we aim to explore additional algorithms and techniques to further improve the accuracy and efficiency of opinion matching. Additionally, incorporating user feedback and preferences into the matching process could enhance the personalization aspect of our methodology. As technology advances and data availability increases, we anticipate the continuous evolution of opinion matching, opening up new opportunities for tailored user experiences and enhanced decision-making processes. |

K-Means

Leveraging k-NN Near Neighbor Vector Similarities and Thresholding for Enhanced Opinion Matching Algorithm Type: K-means is a centroid-based clustering algorithm.

Number of Clusters: The user specifies the desired number of clusters (K) in advance.

Cluster Shape: K-means assumes that clusters are spherical and of equal size.

Distance Metric: K-means uses Euclidean distance to measure the similarity between data points and cluster centroids.

Scalability: K-means can handle large datasets efficiently.

Limitations: K-means may converge to local optima and is sensitive to initial centroid placement. It is not suitable for clustering irregularly shaped or overlapping clusters.

The server running Python micro services is used to watch all publisher desired channels. The real-time streaming content is analyzed, looking for text that appears on the screen. When the onscreen text matches a keyword in the system's messaging warehouse, that message is queued for potential to send all Pass holds tuned to the specific channel. Queued messages are routed to the AI engine where a decision is made to send the message to the user; or do not send the message to the user; or send the message along with additional messages based on AI recommendations and/or predictions. It is important to note the specific implementation and choice of clustering and other models. Algorithms may vary depending on the application, data characteristics, and available resources. The recommendation engine may also incorporate other techniques, such as collaborative filtering, content-based filtering, or hybrid approaches, to further improve the recommendations.

It is also important to note that the system can utilize models and neural networks to implement the functions described herein. The system specifically custom-trains a model per merchant/customer. That is, the system trains a specific model for each merchant based on the merchant's unique data and/or inventory.

1. Data Collection and Preparation:
   - Begin by gathering historical data relevant to your commercial offers, including customer profiles, purchase history, and past offer interactions. This step may include gathering and cleaning data; tokenization; and splitting data into training, validation, and test sets.
   - Clean and preprocess the data, handling missing values, outliers, and converting it into a suitable format for training.
2. Model Selection:
   - Choose an appropriate machine learning model for your task. Popular choices for recommendation systems include collaborative filtering, content-based filtering, and matrix factorization. This step may include choosing a model type GPT-3 (Merchant or Customer); and configuring model architecture with layers and units.
3. Customization of the Model:
   - Customize the selected model to your specific problem. This may involve adjusting model architecture, hyperparameters, or incorporating domain-specific knowledge. This step may include defining loss functions; choosing optimization adam algorithm; setting batch size and learning rate; and initializing model weights.
4. Training the Model:
   - Split the data into training, validation, and test sets. Use the training data to train the model to predict customer responses to offers.
   - During training, the model learns patterns and relationships within the data.

This step includes substeps for each epoch of: shuffling and batching data; Forward Pass>computing predictions; computing loss; Backward Pass<Compute Gradients; and updating model weights. These substeps repeat until convergence or fixed epochs occur.

5. Model Validation:
   - Validate the model's performance on the validation set. Adjust model parameters as needed based on validation results. This step includes evaluating on a validation set.
6. Final Model Training:
   - Train the final model using both the training and validation data to maximize its predictive capabilities. This step includes deploying the trained model for inference; and monitoring and maintaining the model.

Furthermore, each merchant has a threshold for how much the merchant wishes to sell a given product or service. In some embodiments, if a merchant's initial product is not one that meets the user's needs or preferences, the offer generated and sent to the user's wallet Pass will be of another product of the merchant that is similar to the initial product.

Also, as previously mentioned, the system includes a keyword extractor as described herein. The example system of the present disclosure can include a media device having an embedded virtual beacon providing dynamic URLs to user devices or mobile devices, such as Smartphones. In general, the system presents contextual, personalized, targeted advertising to an end user device based on media consumed by a viewer/listener. The contextual advertising can be identified using media device that has been augmented with an embedded beacon. The media device can be a virtual video or audio broadcast or stream or an update to present video/audio devices.

The user has a smart device (such as a Smartphone). The user's smart device downloads an application that allows interaction with the television or the media device having the embedded beacon. Then, it is determined that the user's smart device is within a given proximity of a television or a media device having the embedded virtual beacon. Using various onboarding methods such as QRC, URL, short code, SMS, txt, email or OTP, a scannable QR code is provided by the system and displayed on the television for the user to scan. The user then scans the QR code that is displayed on the television using the user's smart device, and this allows for the system to connect with the television. The system, via the application on the user's smart device, generates a wallet pass that the user can then store in their wallet of their smart device. Thus, the wallet pass allows for "broadcast tv to wallet advertising." At a high level, the wallet pass allows the AI driven system to send targeted, personalized ads to the user based on the user's profile preferences. All the intelligence for predictions and recommendations for ad content is determined in the core system and the Pass simply serves as the receiver of the targeted personalized ad content. For instance, if the user is interested in golfing, then the system can provide golf-related ads to the user, as opposed to soccer-related ads.

Then, the user's smart device transmits the user's information that is stored in the user's smart device to the media device via the Pass. An analysis is then performed by the system which can involve sequencing images of the media being watched or listened to (such as a commercial or television program), for instance, via a television. Utilizing artificial intelligence, the system can extract, scrape or otherwise identify the textual content spoken or displayed on a television screen (other information can be recognized such as audio, sounds, icons, graphics, and so forth). Using the key value extractors the media being consumed can be analyzed for things such as keywords or phrases. These can be processed, and an advertisement can be obtained that pertains to those keywords or phrases. In other words, relevant advertisements can be provided to the user based on those keywords or phrases. Thus, if a tv program has a scene where a box of Tide is displayed, then utilizing artificial intelligence, the BNS system can extract the keyword "Tide" and then provide relevant Tide ads to the user. The system may store relevant ads, such as Tide ads, that can later be provided to one or more users. The key extraction methods utilized by the system can include extracting text from image, audio, symbol, audio signal signature, video image signature, metadata keywords, hash tag, and AI derived real-time context without keywords.

Also, the system can determine, using artificial intelligence, which ad is being watched, by matching keywords of known ads that are stored in the system, and the system can also determine which user is watching what program, thanks to the SDK that the content provider has used to develop their app. The user can then be notified by the system, through a notification on the user's smart device, that the system recognizes that the user is watching a tv program provided by a certain cable channel. The system then matches preferences in the user's profile with merchant keywords to form a keyword triplet at the end of this step.

A dynamic URL can be broadcast (or pushed) wirelessly to the virtual beacon or other similar hardware in the proximity of the media device (again, could include a set top box or dongle, ALEXA audio stream). That is, the system can transmit (either directly or through the backend service) the dynamic URL to the mobile device of a user (could include a Smartphone, Smartwatch, laptop, or other similar device). The mobile device can avail, respond, deny, redeem, or add content (or an offer) when the viewer clicks the URL provided on their mobile device.

A URL link can be associated with the advertisement, and an offer, survey or information and the URL are then delivered to the user device. After the user browses the dynamic timed notification URL, a personalized targeted content landing page is generated in the system and associated with a URL linked to the user's personalized offers. The user can then view the personalized content that is displayed on their Smartphone. The personalized content may include an offer with a question and multiple-choice answers or binary answers. All actions taken by the user (avail, ignore, or answer or acknowledge) are transmitted to the system to update the AI-driven personalized profile of the user.

If after viewing the personalized content, the user indicates that they are interested in the personalized content or the offer, then the content tag of the personalized content is stored in the wallet of the user's smart device. On the other hand, if the user indicates that they are not interested in the personalized content/offer, then the content tag of the personalized content is trashed entirely.

Once the content tag is stored in the wallet of the user's smart device and the user interacts with the content tag (such as by making a purchase using the user's smartphone or accepting an offer at a brick and mortar store), then the fulfillment of the offer has occurred. Real-time attribution data is also determined and then added to the AI-driven personalized profile of the user and stored for reporting.

It will be understood that while some embodiments include a virtual beacon in an object such as a television, the present disclosure is not intended to be limited thereto. That is, the beacon can also be a device that is located externally to device providing the media. Also, the logic of the beacon can be integrated into any device having operating system such as iOS™, Android™, and the like and a method of communication.

Stated otherwise, the system can also include a keystore that receives data from the media device SDK and the key extractor. These data can include information indicative of who is watching and what content is being watched. The system stores a table that retains data pertaining to frequency, correlating to the viewer ID and an identifier of a channel being watched. Each media and smart device are provided with a unique identifier.

In further embodiments, the processing device ACR 140 includes an identification system that extends the ability of the processing device to tie products at a much more granular level. For instance, an offer for a product such as Coke® can be associated with an identifier or a tag. In some embodiments, the identifier is a unique binary code associated with a product or service that is offered in an offer generated by the system and stored in a user's wallet Pass as described above. The identifier can also help to find interrelationships between merchants and media sources based on business or logical connections. The unique identifier can be used for tracking the transmitting of the merchant offer to the user's smart device to a redemption of the merchant offer by the user via the user's smart device. The AI engine of the processing device can continuously gather data in a feedback loop, in order to provide improved recommendations to a merchant or the user, since the data gathered includes the unique identifier for tracking.

For instance, a commercial for Coke® can be played on various TV and radio networks. Through the use of the identifier/tag captured through an offer provided to a user via the system, the system can identify when offers or discounts for a Coke® product are redeemed. The system can also track the purchase of a Coke® product through any types of channels, including a user's purchase of the Coke® product at a brick-and-mortar store. In other words, with the identifier, the system can uncover and track how an offer provided by the system and/or a commercial of a product provided to a user can influence a user to purchase the given product or service. The system can also aggregate this data and provide it to merchants so that they can determine whether or not their marketing campaigns are successful. By tracking the identifier, which can be traced from the original offer provided in a wallet Pass by the system, to the actual purchase of the product or service through a redemption of the offer, the system provides metrics and information to merchants so that they can see the entire tracing from start (e.g., offer generated by the system and stored on a user's wallet Pass) to finish (user's redemption of the offer/purchase online or in person with a merchant or at a brick-and-mortar store).

In further embodiments, an example system of the present disclosure can include a media device having an embedded beacon providing dynamic URLs to user devices, such as Smartphones. In general, the system presents digital content messages to an end user device based on media consumed by a viewer/listener. The digital content messages can be identified using a media app that has been augmented with the BNS SDK. The media content can be a video or audio broadcast or stream. A dynamic URL can be pushed to users using a wireless protocol or other similar hardware that is embedded in the media device (again, this could include a set top box or dongle, ALEXA audio stream).

In some embodiments, the analysis performed by the system ACR can involve sequencing images of the media being watched or listened to (such as a commercial or television program). The ACR in the form of NLP can scrape or otherwise identify the textual content spoken or displayed (other information can be recognized, such as icons, graphics, and so forth).

In some embodiments, the ACR can receive the advertisement media being consumed and analyze that media for things such as keywords or phrases. These can be compared with the offer keywords stored in the BNS offer warehouse. A URL link that is associated with a passholder can be updated if the AI determines the matching offer will be of interest to the passholder. If so, the member portal associated with the URL is updated and a push notification is sent to the user's wallet pass.

It will be understood that while some embodiments include an embedded beacon in an object such as a television, the present disclosure is not intended to be limited thereto. That is, the beacon can also be a device that is located externally to a media device. Also, the logic of the beacon can be integrated into any device having operating system such as iOS™, Android™ and the like. Also, the beacon does not have to be a physical device but can be a virtual beacon. In some embodiments, a virtual beacon is present on the users' mobile device that is implemented through the wallet pass.

The system can also include a keystore that receives data from the SDK and the processing device. These data can include information indicative of who is watching and what content is being watched. The offer warehouse stores data per user and/or per offer pertaining to frequency, correlating to the viewer's passID and identifier of a channel being watched. Each offer is provided with a unique identifier. The input to the offer can include total offer redemption limit. The SDK and processing device can communicate with a backend service provider through an API. The SDK and processing device can return information to the backend service provider such as what channel is being viewed.

The wallet pass establishes a virtual beacon that communicates with the mobile device of the user to obtain relevant contextual information about the viewer information measured directly or determined by the AI engine. The wallet pass virtual beacon provides the data needed to understand the viewing habits of the viewer and advertisements can be tailored to the specific preferences of the viewer, determined from their unique viewing behaviors.

In some embodiments, the features provided by the embedded beacon and/or service provider can fine tune over time based on the advertisements and URLs that a viewer responds to, either positively or negatively.

In sum, the example system provides application-less engagement, allows advertisers to provide customized promotions and offers to viewers, improves content attribution, increases ad content consumption, provides new models for advertising to customers, and enables payment transactions.

An example system that services multiple endpoints is also provided. A plurality of sources can each include an AI docker. Each of the sources provides at least one type of media source, such as a broadcast or other media type. A module can process images obtained from each of these endpoints, as well as apply natural language processing to extract intent/context or other information that can be used to target ads to a viewer. One skilled in the art will appreciate that natural language processing is only one of many other types of processing that the module can accomplish.

The extracted content is received by a Remote Dictionary Server (Redis) database that comprises two key stores and an endpoint mapper. The first keystore reads the continuous text for each media source and stores as the key the channel identifier and the key values, which are the words present on the screen, at a regular interval. The second keystore stores the channel identifier and the key values are the passID, media deviceID and the broadcasterID. This function is referred to as the "mapper". In some instances, the offers can be transmitted to a wallet of the viewer, which can be associated with the device being used to view content and/or to an account for storage and later viewing.

The broadcasterID is a key value that provides the unique ID of a broadcaster, which helps to identify which broadcaster is transmitting the content to the user or viewer. The broadcasterID also allows for the AI engine of the system to trace which specific ad and/or broadcast program the user watched in order to obtain an offer that the user later redeemed. In doing so, by this tracing with the help of the broadcasterID, the AI engine can determine and recommend content to the user or viewer that will entice the user to redeem one or more offers in the future. As described above, the system can also include a keystore that receives data from the embedded beacon. This data can include information indicative of who is watching and what content is being watched. The embedded beacon can store a table of that retains data pertaining to frequency, correlating to the viewer's name or an identifier of a channel being watched (e.g., the broadcasterID). Each embedded beacon is provided with a unique identifier. The input to the embedded beacon can include frequency. The embedded beacon can communicate with a backend service provider through an API. The embedded beacon can return information to the backend service provider such as what channel is being viewed.

The embedded beacon communicates with the mobile device of the user to obtain relevant contextual information about the viewer, such as demographic information. The embedded beacon can track the viewing habits of the viewer and advertisements can be tailored to the specific preferences of the viewer, determined from their unique viewing behaviors.

In some embodiments, the features provided by the embedded beacon and/or service provider can fine tune over time based on the advertisements and URLs that a viewer responds to, either positively or negatively.

Figure 7:
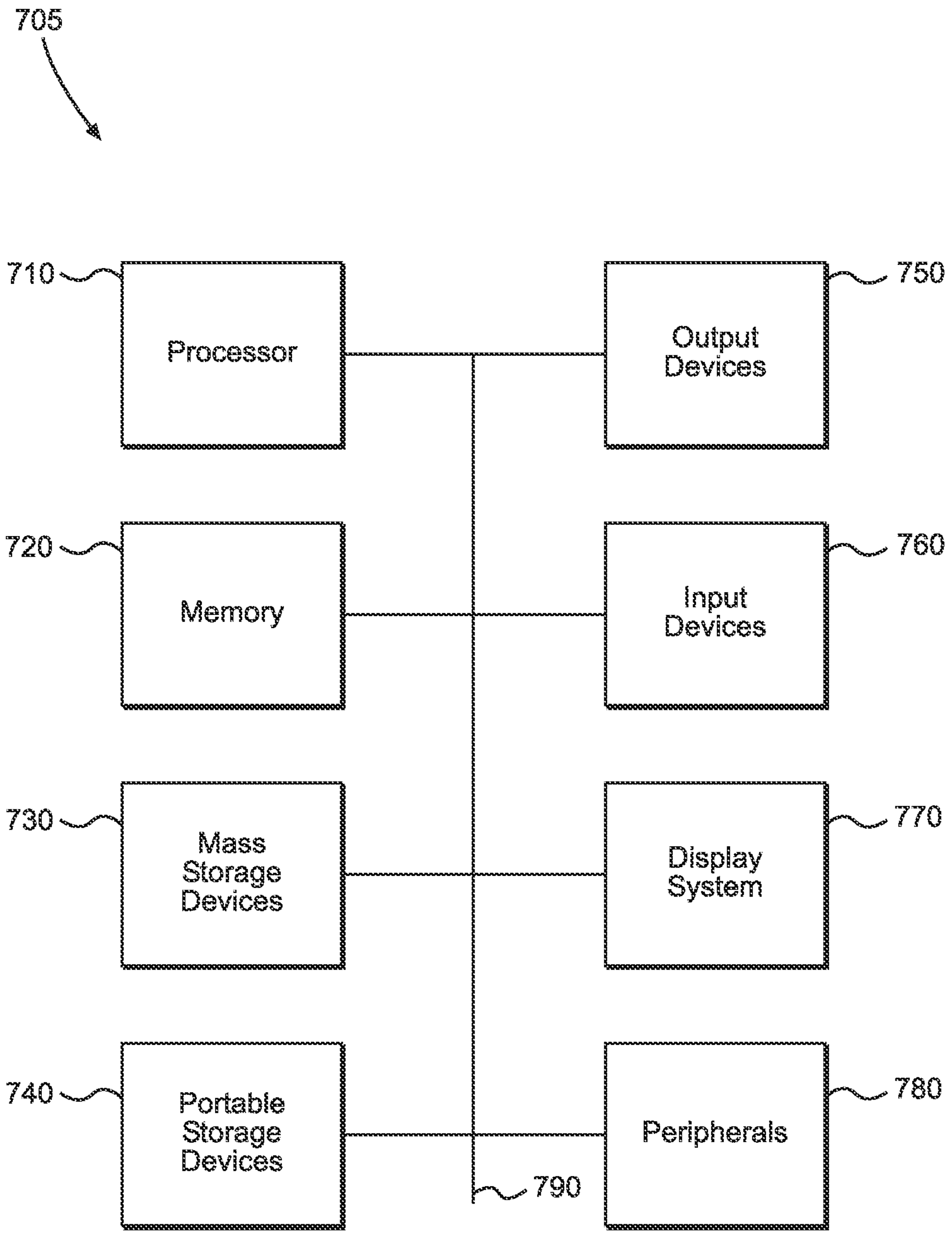

FIG. 7 is a diagrammatic representation of an example machine in the form of a computer system 705, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 705 may serve as a computing device for a machine, within which a set of instructions for causing the machine to perform any one or more of the methodologies discussed herein can be executed. The computer system 705 can be implemented in the contexts of the likes of computing systems, networks, servers, or combinations thereof. The computer system 705 includes one or more processor units 710 and main memory 720. Main memory 720 stores, in part, instructions and data for execution by processor units 710. Main memory 720 stores the executable code when in operation. The computer system 705 further includes a mass data storage 730, a portable storage device 740, output devices 750, user input devices 760, a graphics display system 770, and peripheral devices 780. The methods may be implemented in software that is cloud-based.

The components shown in FIG. 7 are depicted as being connected via a single bus 790. The components may be connected through one or more data transport means. Processor units 710 and main memory 720 are connected via a local microprocessor bus, and mass data storage 730, peripheral devices 780, the portable storage device 740, and graphics display system 770 are connected via one or more I/O buses.

Mass data storage 730, which can be implemented with a magnetic disk drive, solid state drive, or an optical disk drive, is a non-volatile storage device for storing data and instructions for use by processor units 710. Mass data storage 730 stores the system software for implementing embodiments of the present disclosure for purposes of loading that software into main memory 720.

The portable storage device 740 operates in conjunction with a portable non-volatile storage medium, such as a floppy disk, compact disk (CD), Digital Versatile Disc (DVD), or USB storage device, to input and output data and code to and from the computer system 705. The system software for implementing embodiments of the present disclosure is stored on such a portable medium and input to the computer system 705 via the portable storage device 740.

User input devices 760 provide a portion of a user interface. User input devices 760 include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 705 includes output devices 750. Suitable output devices include speakers, printers, network interfaces, and monitors.

Graphics display system 770 includes a liquid crystal display or other suitable display device. Graphics display system 770 receives textual and graphical information and processes the information for output to the display device. Peripheral devices 780 may include any type of computer support device to add additional functionality to the computer system.

Figure 8:
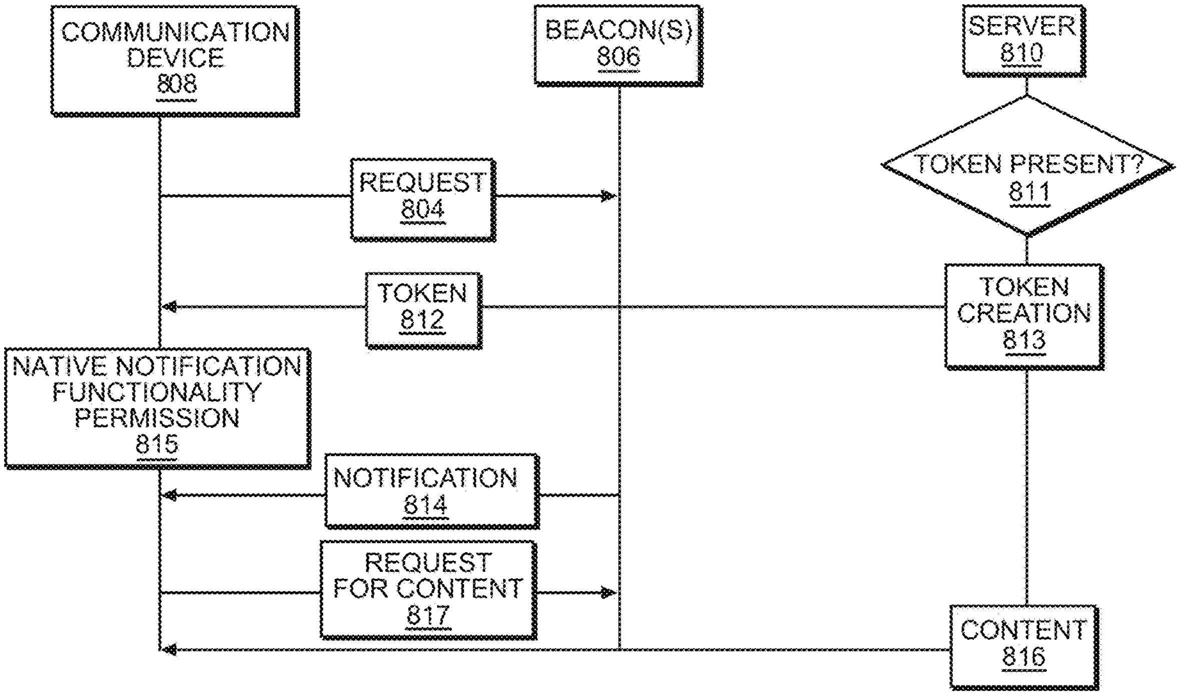

FIG. 8 is a signal flow diagram illustrating a method performed in accordance with the present disclosure. In some embodiments, the method includes receiving a request 804 for content by a beacon(s) 806 of a beacon architecture from a communication device 808 that is in short-range communication proximity to the beacon(s). In general, the beacon architecture can include any of the systems described herein that are consistent with the functional descriptions provided in FIG. 8. In general, the beacon architecture illustrated in FIG. 8 can include a server 810 and the beacon(s) 806.

The method also includes a token 812 that is transmitted to the communication device 808 that allows for delivery of notifications to the communication device 808 using a native notification functionality of the communication device 808. As noted herein, this can include a cookie or other means for accessing and using a native notification functionality of the communication device 808. Another example includes creating or establishing a digital wallet pass on the communication device 808, which is also understood to include a process for establishing permission to use a native notification function in process 815. The use of digital wallet pass could be used in place of or in combination with the cookie described herein. When used in combination the token is used as a means for gathering device related information and the digital wallet pass is used to establish permission for delivering notifications.

In various embodiments, the request 804 is forwarded to the server 810, and the server 810 determines if a cookie and/or fingerprint (e.g., is this device known?) are present in process 811. If no fingerprint or cookie is present, the server 810 can generate a cookie or fingerprint in process 813 and return a token 812 as noted above.

In some embodiments, the method includes a notification 814 being transmitted to the communication device 808. As mentioned throughout, the notification comprises a link to the content such as a static or dynamic URL.

In one or more embodiments, the method includes content 816 being transmitted to the communication device 808 based on a selection of the link (request for content 817). In some embodiments the content is displayed on the communication device 808 or on a display that is located proximately to the communication device 808. The content can include any digital content.

The term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A system comprising:

one or more media sources;

a physical or virtual beacon that has a unique passID;

a user's smart device configured to be bound to a media device using a wallet Pass and deterministically associate the user's smart device with media being received from the one or more media sources, the user's smart device further configured for storing the wallet Pass, the user's smart device for detecting when a user is in physical proximity of the media device and for receiving messages from a messaging system through the stored wallet Pass, the user's smart device further comprising a web browser for viewing unique URLs contained in messages received in the wallet Pass;

the media device for:

detecting a channel that the user has selected;

transmitting the channel information to a server; and receiving media from the one or more media sources; and a processing device for:

receiving a request for offer content by the physical or virtual beacon from a user's smart device that is in short-range communication proximity to the physical or virtual beacon in an environment;

transmitting a token to the user's smart device that allows for delivery of notifications to the user's smart device;

extracting one or more key values from the media utilizing artificial intelligence processing of the media, the extracting comprising:

performing automatic content recognition on at least one of video frames, audio signals, metadata, symbols; and using a TF-IDF (Term Frequency-Inverse Document Frequency) or a TextRank keyword extraction models, identify significant keywords from the recognized content;

normalizing the one or more key values and storing the normalized key values as key-value pairs indexed by channel identifier in a datastore, the normalization comprising converting the one or more key values to root form;

matching one or more key values from the media to a key value associated with a first merchant offer of a merchant;

providing personalized offer content based on user preferences and past responses to previous merchant offers using k-Nearest Neighbors clustering AI and thresholding to achieve the user's near neighbor vector similarities to achieve highly accurate and efficient opinion matching;

providing personalized offer content based on user location;

transmitting a notification to the user's smart device, the notification comprising a link to the offer content, the offer content comprising an unique URL of a first merchant offer;

transmitting the offer content to the user's smart device based on a selection of the link;

receiving initial offer content preferences for the offer content and a request for the offer content within the environment;

receiving the offer content from a real-time database based on parameters of the request; and updating the offer content over time based on negative and positive feedback received, the updating comprising utilizing artificial intelligence (AI) algorithms of an AI engine to provide AI-generated feedback to the merchant in a feedback loop, the feedback loop comprising:

monitoring the user's interaction with a first merchant offer via the user's smart device by tracking a unique identifier associated with the first merchant offer;

based on the user's interaction with the first merchant offer and the unique identifier, capturing user behavior data; and based on the captured user behavior data:

refining the AI algorithms of the AI engine;

providing AI-generated feedback to the merchant, the AI-generated feedback comprising an AI-generated improved offer recommendation or prediction; and based on the AI-generated improved offer recommendation or prediction, generating and transmitting a second merchant offer to the user's smart device, the generating and transmitting of the notification and the offer content being conditioned on detection of the physical proximity of the user's smart device to the media device and the matching of the one or more extracted key values to the key value associated with the first merchant offer.

2. The system according to claim 1, wherein the processing device is for:

receiving a notification that the user is in physical proximity of the media device, based on the media device and the user device recognizing each other as being on the network, when the user is in physical proximity of the media device, providing personalized offer content based on user preferences, past responses and user location; and multiplexing of merchant offers occurs, such that merchant offers are linked to other offers which have a business or logical connection.

3. The system according to claim 1, wherein one or more of the virtual beacon, the user's smart device, the media device and the processing device are communicatively coupled to a network.

4. The system according to claim 3, wherein the network is a cloud.

5. The system according to claim 1, wherein the media device comprises a television, set-top-box, or any other hardware that is configured to deliver the media through linear broadcast TV or OTT/CTV.

6. The system according to claim 1, wherein the offer sent to the wallet Pass is determined by an AI algorithm used by the processing device to extract information from the media.

7. The system according to claim 1, wherein the media device presents to the viewer a QR code that, when scanned by the media device, links the media device ID with a wallet pass ID, the wallet pass in turn linked to a unique URL for the viewer, and the wallet Pass being stored in a native electronic wallet application of the user's smart device.

8. The system according to claim 1, wherein the cloud includes an AI engine, and attribution data is collected and inputted into the AI engine to help guide future notification predictions and recommendations, wherein numerous across boundary interfaces in the system are collection points for the attribution data.

9. The system according to claim 1, wherein when the user wishes to redeem an offer, they browse and select the offer in their member portal which serves as a repository of all previously accepted merchant offers.

10. The system according to claim 1, wherein extracting one or more key values from the media further comprises extracting keywords extracted from audio using natural language processing.

11. The system according to claim 1, extracting one or more key values from the media further comprises extracting audio, symbols in the image, offer content file metadata, advertising pixel tag, hash tags, AI derived context or any combination thereof, from the media.

12. A method, comprising:

receiving a request for offer content by the physical or virtual beacon from a user's smart device that is in short-range communication proximity to the physical or virtual beacon in an environment;

transmitting a token to the user's smart device that allows for delivery of notifications to the user's smart device;

extracting one or more key values from media, the extracting comprising:

performing automatic content recognition on at least one of video frames, audio signals, metadata, symbols;

using a TF-IDF (Term Frequency-Inverse Document Frequency) or a TextRank keyword extraction models, identify significant keywords from the recognized content; and deterministically associating the user's smart device with the media;

normalizing the one or more key values and storing the normalized key values as key-value pairs indexed by channel identifier in a datastore, the normalization comprising converting the one or more key values to root form;

matching the one or more key values from the media to a key value of offers in a merchant offer warehouse;

providing personalized offer content based on user preferences and past responses to previous merchant offers using k-Nearest Neighbors clustering AI and thresholding to achieve the user's near neighbor vector similarities to achieve highly accurate and efficient opinion matching;

providing personalized offer content based on user location;

transmitting a notification to the communication device to the user's smart device, the notification comprising a link to the offer content, the offer content comprising a URL of a first merchant offer;

transmitting the offer content to the communication device based on a selection of the link;

receiving initial offer content preferences for the offer content and a request for the offer content within the environment;

receiving the offer content from a real-time database based on parameters of the request; and updating the offer content over time based on negative and positive feedback received, the updating comprising utilizing artificial intelligence (AI) algorithms of an AI engine to provide AI-generated feedback to the merchant in a feedback loop, the feedback loop comprising:

monitoring the user's interaction with the first merchant offer via the user's smart device by tracking a unique identifier associated with the first merchant offer;

based on the user's interaction with the first merchant offer and the unique identifier, capturing user behavior data; and based on the captured user behavior data:

refining the AI algorithms of the AI engine;

providing AI-generated feedback to the merchant, the AI-generated feedback comprising an AI-generated improved offer recommendation or prediction; and based on the AI-generated improved offer recommendation or prediction, generating and transmitting a second merchant offer to the user's smart device, the generating and transmitting of the notification and the offer content being conditioned on detection of the physical proximity of the user's smart device to the media device and the matching of the one or more extracted key values to the key value associated with the first merchant offer.

13. The method of claim 12, wherein extracting one or more key value from the media; further comprises extracting keywords extracted from audio using natural language processing.

14. The method of claim 12, further comprising:

determining a merchant offer to be sent to the user's smart device, based on AI processing used by a processing device to extract one or more key values from the media.

15. The method of claim 12, wherein user AI clustering:

determines user behavior without having the user directly input any profile information;

personalizes the user experience; and provides offer content recommendations and predictions for targeted ads tailored to user preferences delivering personalized and relevant offers to the user.

16. The method of claim 12, further comprising:

utilizing AI offer optimization to generate recommendations for products that are not currently associated with a merchant campaign; and sending a report of the generated recommendations to the merchant.

17. The method of claim 12, wherein matching the one or more key values from the media to a key value of offers in a merchant offer warehouse further comprising AI clustering to categorize users into different user segments, in order to generate recommendations and predictions regarding which offer to send to the user.

18. The method of claim 12, further comprising collecting attribution data.

19. The method of claim 12, wherein extracting one or more key values from the media further comprises extracting audio, symbols in the image, offer content file metadata, advertising pixel tag, hash tags, AI derived context or any combination thereof, from the media.

20. The method of claim 12, further comprising utilizing artificial intelligence to extract, scrape or otherwise identify textual offer content spoken or displayed on a television screen being viewed by the user.

21. The system of claim 1, wherein the media device comprises a connected television (CTV) device or Over-the-Top (OTT) streaming device.

22. The method of claim 12, wherein the extracting one or more key values from the media is performed in real-time while the media stream is transmitted to the media device.

23. The system of claim 1, further comprising associating redemption events of content offers with the broadcast ID that triggered the notification.

24. The method of claim 12, further comprising detecting a playback event within the media and triggering transmission of the notification based on the detection of the media playback event.

25. The method of claim 1, wherein the virtual beacon is a software-defined identifier associated with the media device or the media session that enables contextual communication between a user's smart device and the media device.

* * * * *